United States Patent
Yamaguchi et al.

(10) Patent No.: US 7,636,483 B2
(45) Date of Patent: Dec. 22, 2009

(54) CODE TYPE DETERMINING METHOD AND CODE BOUNDARY DETECTING METHOD

(75) Inventors: Nobuyasu Yamaguchi, Kawasaki (JP); Hiroyuki Takakura, Kawasaki (JP); Hirotaka Chiba, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 997 days.

(21) Appl. No.: 10/853,667

(22) Filed: May 26, 2004

(65) Prior Publication Data

US 2005/0121520 A1    Jun. 9, 2005

(30) Foreign Application Priority Data

Dec. 5, 2003    (JP) .............................. 2003-408104

(51) Int. Cl.
    *G06K 9/36* (2006.01)
(52) U.S. Cl. ..................................................... 382/239
(58) Field of Classification Search ................ 382/181, 382/183, 205, 232, 235, 237, 392, 296, 298; 235/462.01, 462.09, 462.1, 462.11
    See application file for complete search history.

(56) References Cited

U.S. PATENT DOCUMENTS

| | | | |
|---|---|---|---|
| 4,924,078 A | 5/1990 | Sant'Anselmo et al. | |
| 5,457,309 A | 10/1995 | Pelton | |
| 5,487,115 A * | 1/1996 | Surka | 382/296 |
| 5,525,787 A | 6/1996 | Kubo | |
| 5,691,527 A | 11/1997 | Hara et al. | |
| 5,726,435 A | 3/1998 | Hara et al. | |
| 5,896,403 A | 4/1999 | Nagasaki et al. | |
| 5,987,192 A * | 11/1999 | Maltsev et al. | 382/298 |
| 6,015,088 A * | 1/2000 | Parker et al. | 235/462.01 |
| 6,082,619 A * | 7/2000 | Ma et al. | 235/462.1 |
| 6,250,551 B1 | 6/2001 | He et al. | |
| 6,565,003 B1 | 5/2003 | Ma | |
| 6,937,349 B2 * | 8/2005 | Jones et al. | 356/617 |
| 7,227,661 B2 * | 6/2007 | Matsunoshita | 358/1.15 |
| 2002/0051573 A1 | 5/2002 | Sakai et al. | |
| 2002/0150276 A1 | 10/2002 | Chang | |
| 2005/0200903 A1 | 9/2005 | Okubo | |

FOREIGN PATENT DOCUMENTS

| | | |
|---|---|---|
| EP | 1 160 720 A2 | 12/2001 |
| EP | 1 615 420 A1 | 1/2006 |
| JP | 5-6549 A | 1/1993 |

(Continued)

OTHER PUBLICATIONS

Search Report dated Jan. 30, 2008, issued in corresponding European Patent Application No. 04028562.9—2210.

(Continued)

*Primary Examiner*—Jose L Couso
(74) *Attorney, Agent, or Firm*—Fujitsu Patent Center

(57) ABSTRACT

A code type determining method comprises a block selecting step of selecting input image data in units of rectangular blocks, a block determining step of determining whether or not the selected block satisfies a predetermined condition, and a code determining step of determining a type of code included in the block which satisfies the predetermined condition.

17 Claims, 27 Drawing Sheets

FOREIGN PATENT DOCUMENTS

| | | |
|---|---|---|
| JP | 5-314298 A | 11/1993 |
| JP | 06-044397 | 2/1994 |
| JP | 06-266879 | 9/1994 |
| JP | 7-254037 | 10/1995 |
| JP | 8-180125 | 7/1996 |
| JP | 9-218914 | 8/1997 |
| JP | 2000-57250 A | 2/2000 |
| JP | 2000-501533 | 2/2000 |
| JP | 2000-200321 | 7/2000 |
| JP | 2001-125586 A | 5/2001 |
| JP | 2001-307014 | 11/2001 |
| JP | 2002-41199 | 2/2002 |
| JP | 2003-298799 A | 10/2003 |
| JP | 2003-331235 A | 11/2003 |
| WO | WO 97/39419 | 10/1997 |

OTHER PUBLICATIONS

Japanese Office Action dated Oct. 2, 2007, Application No. 2003-408104.

European Search Report dated Apr. 29, 2008, Application No. 04028562.9—2210.

"Japanese Office Action", Partial English Translation, Japanese Application. No. 2007-312442, dated Feb. 17, 2009.

* cited by examiner

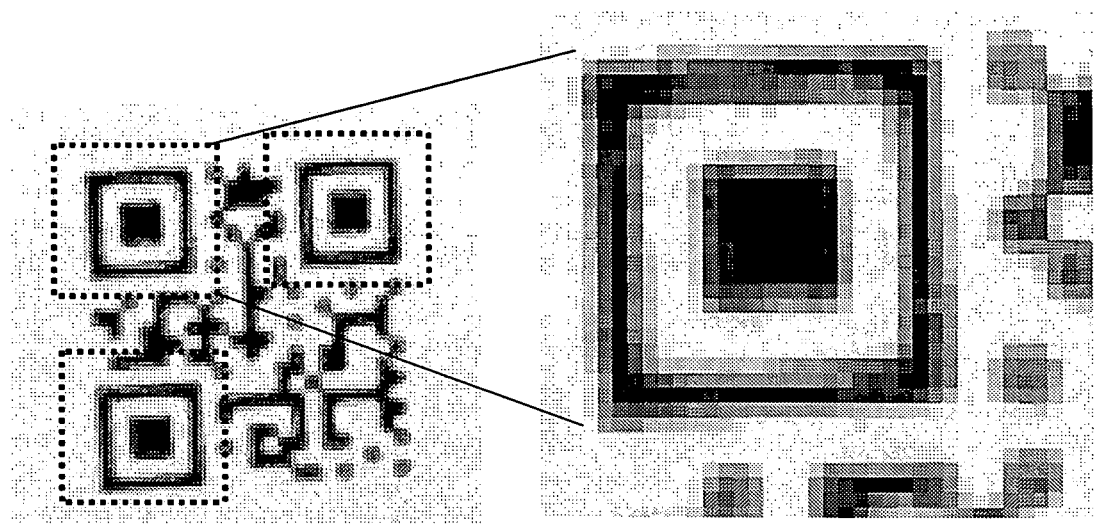
DETECTING POSITIONING SYMBOLS
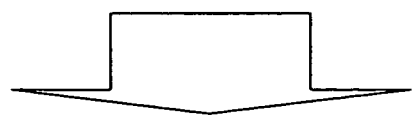
EXTRACTING CODE REGION
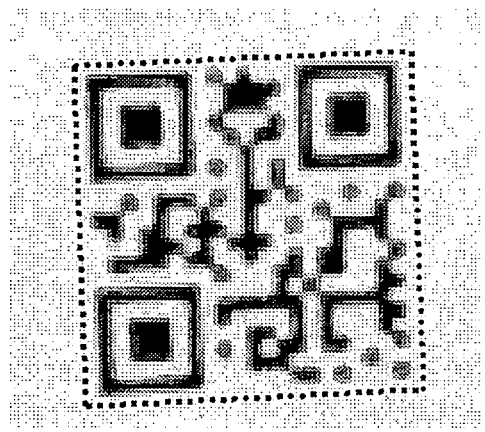
F I G. 1

ONE-DIMENSIONAL CODE    TWO-DIMENSIONAL CODE
F I G. 3

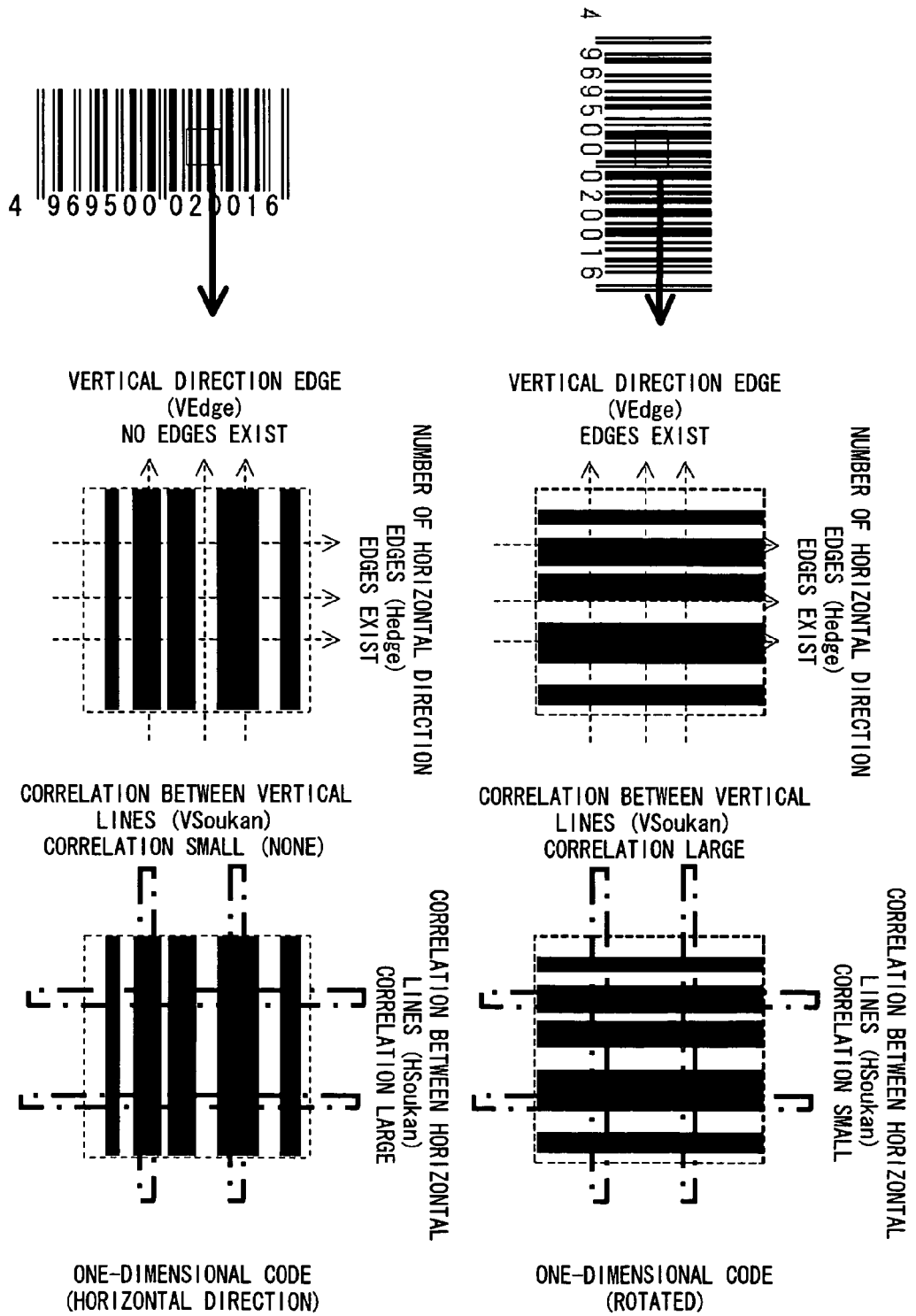
F I G. 6

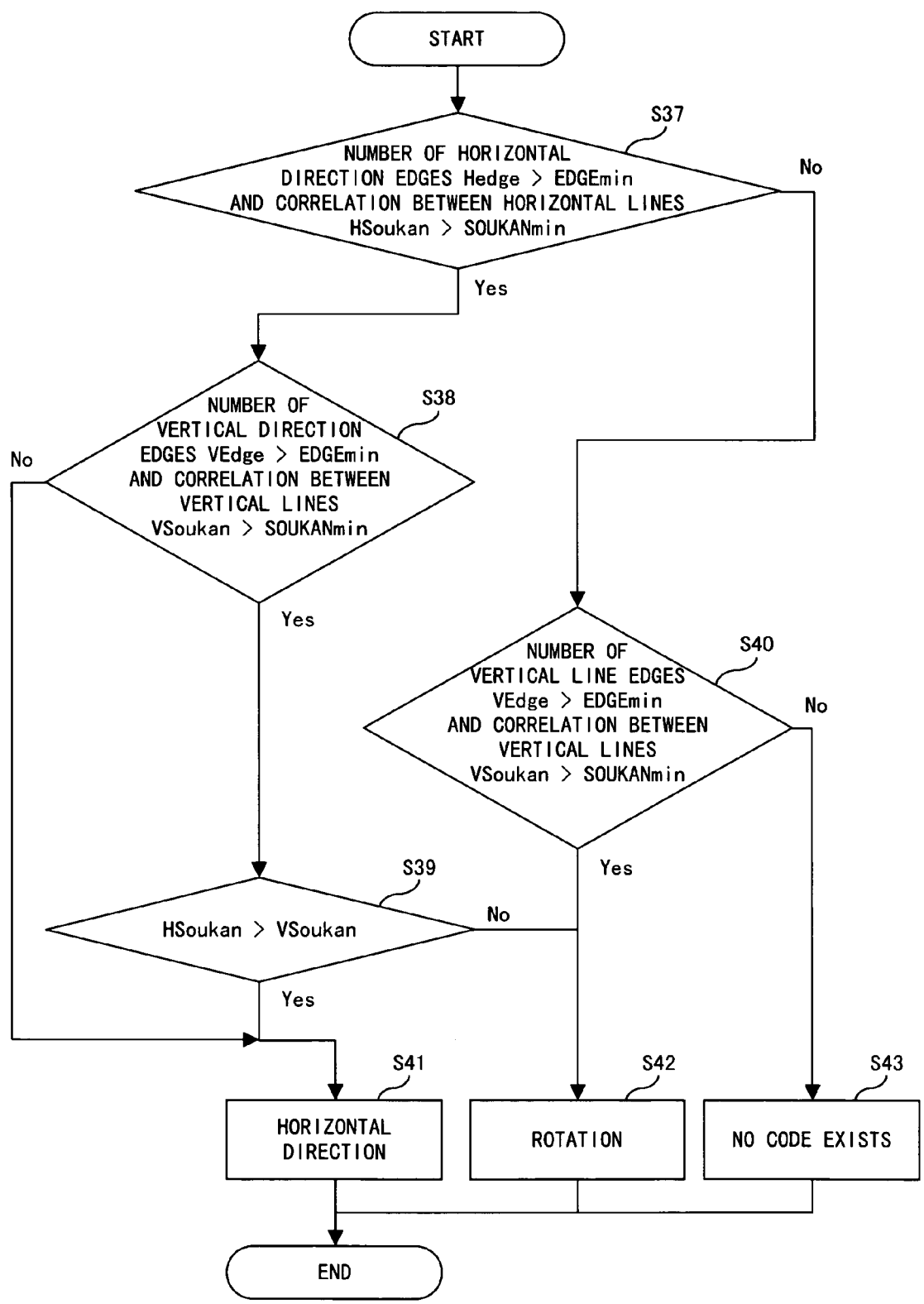
F I G. 9

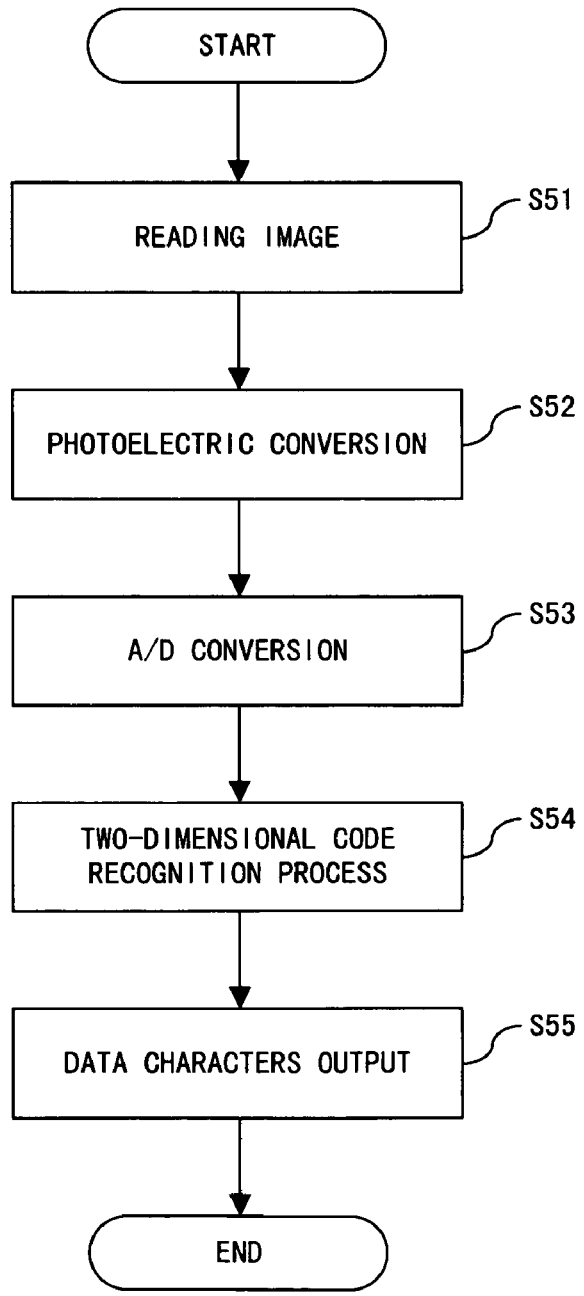
F I G. 1 1

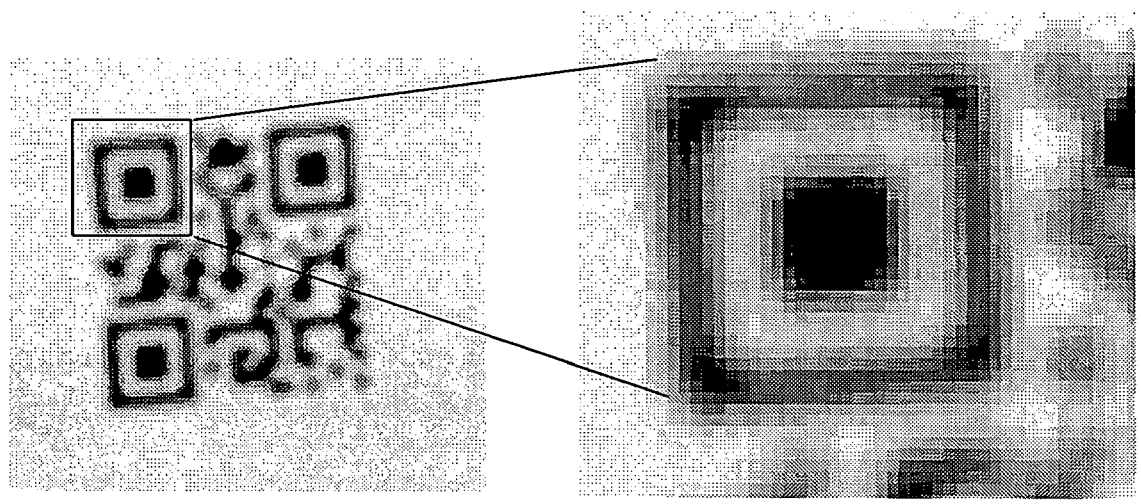
IMPROVEMENT
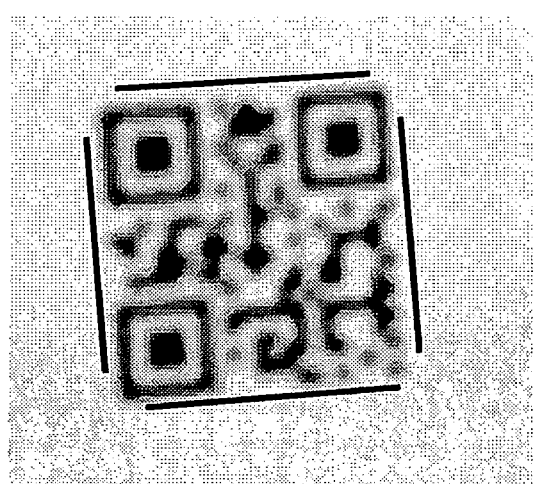
F I G. 1 4

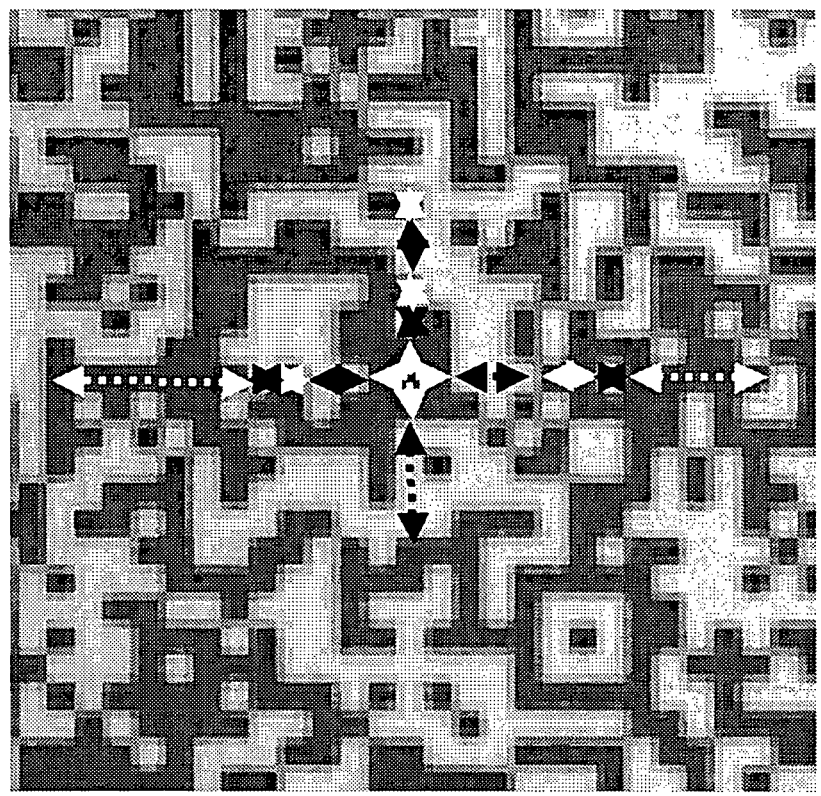
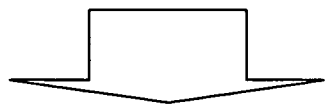
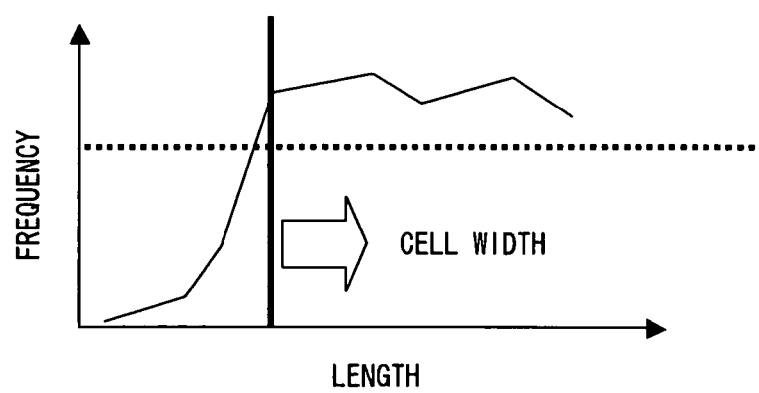
F I G. 1 5

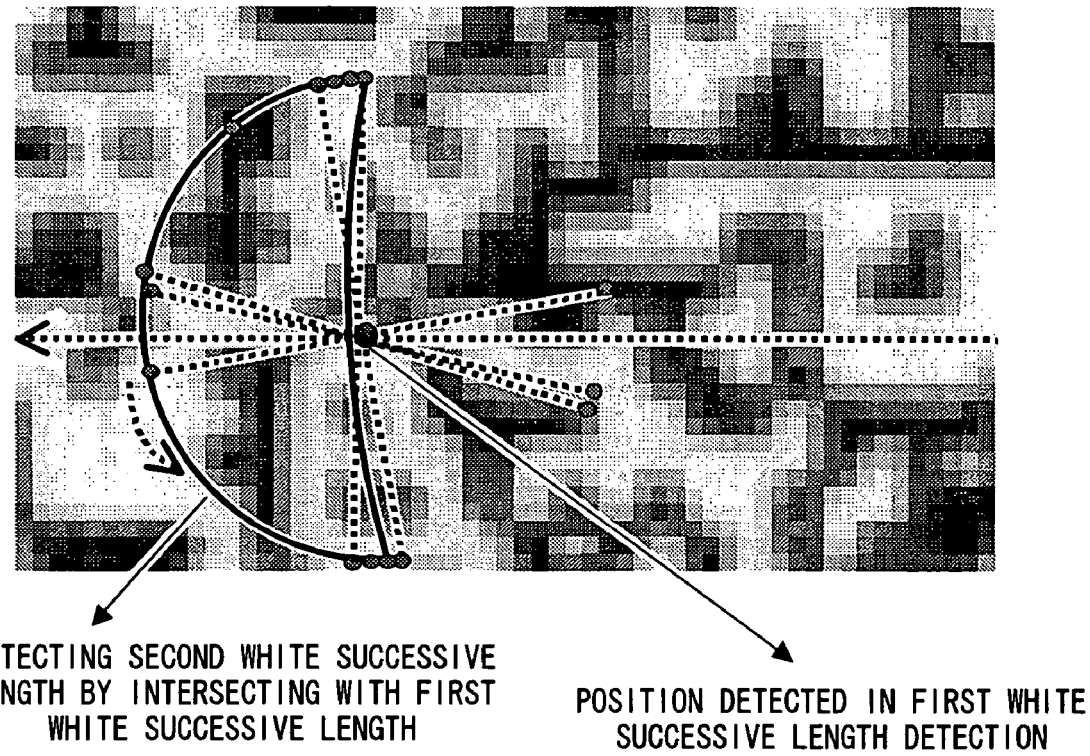
DETECTING SECOND WHITE SUCCESSIVE LENGTH BY INTERSECTING WITH FIRST WHITE SUCCESSIVE LENGTH
POSITION DETECTED IN FIRST WHITE SUCCESSIVE LENGTH DETECTION
F I G. 1 7

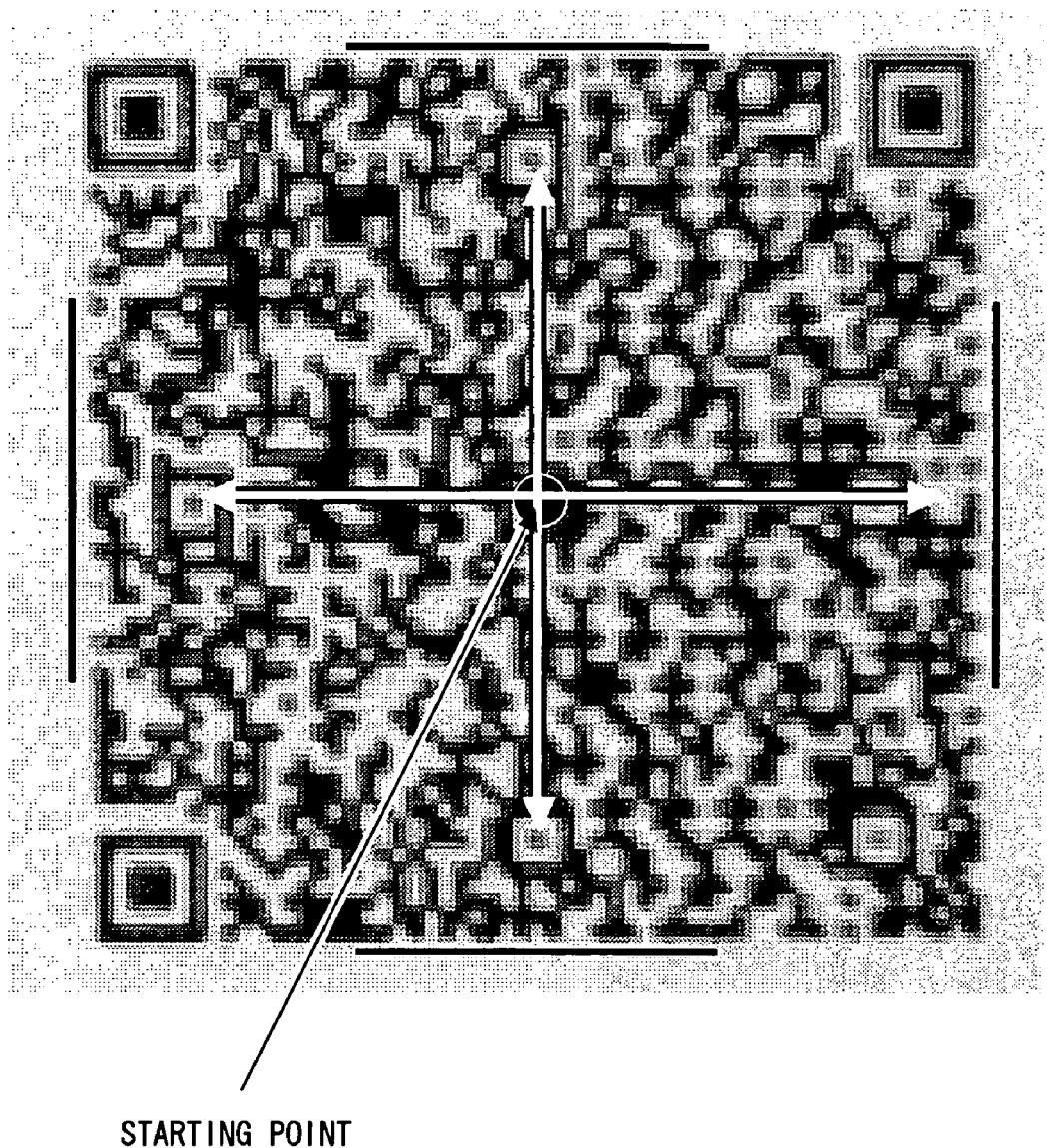
STARTING POINT
F I G. 2 1

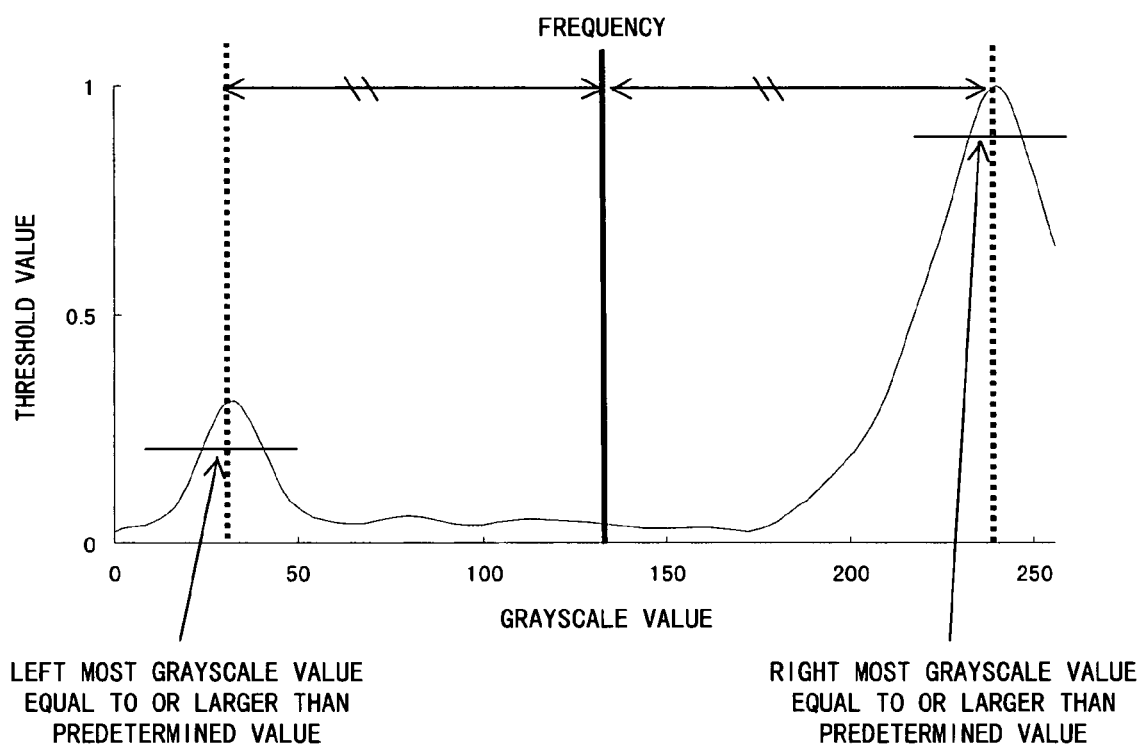
F I G. 2 2

SETTING THRESHOLD VALUE FOR
EACH PREDETERMINED REGION

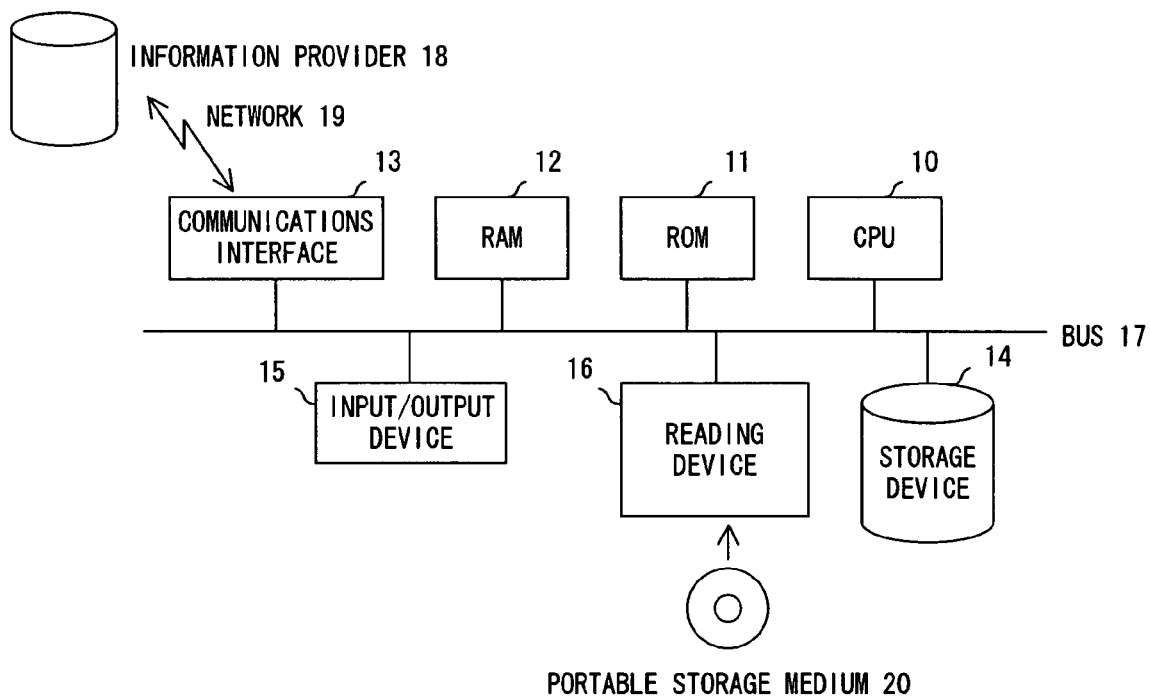
F I G. 27

CODE TYPE DETERMINING METHOD AND CODE BOUNDARY DETECTING METHOD

BACKGROUND OF THE INVENTION

1. Field of the Invention

The present invention relates to a method recognizing one-dimensional bar code or two-dimensional code, and more particularly, to a code type determining method detecting the presence/absence, the position, the type, etc. of one-dimensional/two-dimensional code from electronic image data where the one-dimensional/two-dimensional code is arranged along with a document or a graphic/chart, or from image data obtained by reading a paper sheet, on which the one-dimensional/two-dimensional code is arranged along with a document or a graphic/chart, with an image reading device such as a scanner, a CCD camera, etc., and to a code boundary detecting method accurately detecting a boundary of two-dimensional code.

2. Description of the Related Art

Conventionally, one-dimensional bar code is widely used. For the one-dimensional bar code, its bar code data can be recognized only if data by one line in the direction orthogonal to a black or white bar as a straight line which forms the code exists. To implement this, a device obtaining data by one line, such as a laser line scanner and a CCD line sensor is widely used as a reading device. Additionally, in recent years, two-dimensional code in which a lot more information than in such a one-dimensional bar code can be embedded has become widespread. The two-dimensional code cannot be properly recognized unless two-dimensional arrangement data of the entire code exists. Therefore, an image reading device such as a digital camera, an image scanner, etc. is used as a reading device. Also an image reading device that automatically recognizes both one-dimensional code and two-dimensional code has been commercialized as a single reading device.

Additionally, with the popularization of one dimensional/two-dimensional code, not only reading of code printed on a dedicated label up to now, but also printing of code of an arbitrary size in an arbitrary position along with a document or a graphic/chart is performed in many cases. If one-dimensional/two-dimensional code of an arbitrary size is arranged in an arbitrary position along with a document or a graphic/chart in this way, and if the code is read with a digital camera or an image scanner, there is a great possibility that part of the characters or the graphic/chart is also captured as image data in addition to the one-dimensional/two-dimensional code.

In such a case, the code cannot be properly recognized unless the position of the one-dimensional/two-dimensional code is detected, and only the range of the code is extracted. Additionally, since the recognition methods of the one-dimensional and the two-dimensional codes are totally different, recognition processes for both of the one-dimensional and two-dimensional codes are sequentially applied unless code existing in image data is proved to be either one-dimensional or two-dimensional code beforehand. As a result, a lot of time is required for the processing. Additionally, for the two-dimensional code, its recognition process cannot be executed unless the position of a boundary is properly identified, and the whole of a code region is extracted.

As described above, if a decoding process for two-dimensional code is executed for an entire image, for example, after a decoding process as a recognition process for one-dimensional code fails, the decoding process that is originally slow and heavy is executed twice. Furthermore, the decoding process for one-dimensional code is executed, for example, by supposing that the code exists in the horizontal direction of an obtained image. If the process fails, it must be again executed by supposing that the code exists in the vertical direction rotated by 90 degrees. This consumes a lot more time.

Japanese Patent Publication No. 2001-367014 "Two-dimensional Code Extracting Method" discloses a technique for obtaining the distribution of a black pixel ratio, etc. from a document including characters and other images, for detecting a block expected to be two-dimensional code, and for extracting as a two-dimensional code region a region where such blocks are successive.

Japanese Patent Publication No. 2000-200321 "Method Detecting the Position of Two-dimensional Bar Code and Reading the Two-dimensional Bar Code" discloses a technique for decoding information encoded in a digital manner in the form of two-dimensional bar code that does not include corner bits, has no boundary printed on a printing medium, and has no block.

Japanese Patent Publication No. HEI8-180125 "Two-dimensional Code Reading Device" and Japanese Patent Publication No. HEI7-254037 "Two-dimensional Code" disclose two-dimensional code whose reading accuracy is high, and its reading device, and use three positioning symbols in order to detect two-dimensional code. Japanese Patent Publication No. HEI8-180125 discloses a technique for detecting the positioning symbols in a hardware manner.

However, Japanese Patent Publication No. 2001-307014 and Japanese Patent Publication No. 2000-200321 target the reading of only two-dimensional code, and cannot detect, especially, one-dimensional code if the one-dimensional/two-dimensional code of an arbitrary size is arranged in an arbitrary position along with a document or a graphic/chart, etc.

Additionally, Japanese Patent Publication No. HEI8-180125 and Japanese Patent Publication No. HEI7-254037 detect the position or the region of code by detecting a positioning symbol included in two-dimensional code. With these methods, if the optical resolution of an input device is low, or if an optical distortion or out-of-focus occurs, this symbol cannot be detected because the shape of the positioning symbol within an image is deteriorated and deformed, and two-dimensional code cannot be accurately detected from the image data where a graphic/chart or characters are arranged.

FIG. 1 explains an example of a conventional code region extracting method using such positioning symbols. In two-dimensional code where positioning symbols exist in the upper left, the lower left, and the upper right of a code region as shown in this figure, the code region can be extracted by detecting these positioning symbols. However, for example, if an optical resolution is low, the positioning symbols cannot be detected.

SUMMARY OF THE INVENTION

An object of the present invention is to detect not only the position of one-dimensional/two-dimensional code, but also a code type that indicates either one-dimensional code or two-dimensional code if the one-dimensional/two-dimensional code of an arbitrary size is arranged in an arbitrary position along with a document or a graphic/chart, and to simultaneously detect the presence/absence of rotation in the case of the one-dimensional code.

Another object of the present invention is to enable an entire code region to be extracted with high accuracy by properly detecting a boundary of two-dimensional code.

A code type determining method according to the present invention comprises: a block selecting step of selecting input image data in units of rectangular blocks; a block determining step of determining whether or not the selected block satisfies a predetermined condition; and a code determining step of determining the type of code included in the block which satisfies the predetermined condition. The determined type of code, etc. is output by a result outputting step.

In a preferred embodiment of the present invention, a distinction between one-dimensional code and two-dimensional code can be also made as a code type in the code determining step. In the preferred embodiment, a rotation detecting step of determining whether or not one-dimensional code is in a rotated state if a code type is determined to be the one-dimensional code can be comprised.

In the preferred embodiment, a determination that the dispersion of grayscale values of pixels within a block is within a predetermined range can be also made as a predetermined condition in the block determining step, and a determination that the ratio of black pixels to white pixels within the block is within a predetermined range can be also made as the predetermined condition.

Furthermore, in the preferred embodiment, a determination that the number of edges at each of which the grayscale value of a pixel suddenly changes in a line in the horizontal direction and/or in the vertical direction within a block falls within a predetermined range can be also made as the above described predetermined condition and/or code type determination condition in the block determining step and/or the code determining step, and also a determination that a correlation among grayscale values of pixels in two or more horizontal lines and/or in two or more vertical lines can be made.

A code boundary detecting method according to the present invention is a method detecting a boundary of two-dimensional code where data put into cells is arranged in a two-dimensional state. This method at least comprises a first white successive length detecting step, a second white successive length detecting step, and a boundary detecting step.

The first white successive length detecting step is intended to detect the successive length of white cells by scanning input image data, whereas the second white successive length detecting step is intended to detect the successive length of white cells, which has an intersection with the first white successive length and exceeds a predetermined length, by scanning the input image data in the direction intersecting with the first white successive length. The boundary detecting step is intended to detect an intersection of the first and the second white successive lengths as a code boundary position.

In a preferred embodiment according to the present invention, an upward, downward, leftward, or rightward code boundary can be also detected in the boundary detecting step by scanning the input image data in an upward, downward, leftward, or rightward direction from a point within a code in correspondence with the position of the code identified beforehand in the first white successive length detecting step.

In the preferred embodiment according to the present invention, a cell width detecting step of detecting a cell width can be further comprised, and the successive length of white cells can be also decided by using the cell width as a reference. The cell width detecting step can comprise a step of scanning input image data from a point within a code in correspondence with the position of the code identified beforehand, of creating a histogram which indicates the frequencies of the successive length of white cells and/or the successive length of black cells, and a step of deciding as a cell width a minimum successive length among successive lengths having a frequency equal to or greater than a predetermined value in the histogram.

Additionally, in the preferred embodiment, a step of deciding a threshold value used in the detection of the successive length of white cells can be further comprised, and a cell having a grayscale value equal to or larger than the threshold value can be also detected as a white cell, or the threshold value deciding step is repeated, by way of example, for each scanning of a predetermined distance when input image data is scanned in the first white successive length detecting step, and a cell having a grayscale value equal to or lager than the threshold value updated by the repetition can be also detected as a white cell.

The threshold value deciding step can comprise a step of creating a histogram which indicates the frequencies of grayscale values of cells within a predetermined range, a step of obtaining a first grayscale value which corresponds to a peak on a side of large grayscale values, and a second grayscale value which corresponds to a peak on a side of small grayscale values in the histogram, and a step of deciding an average value of the first and the second grayscale values as a threshold value.

Furthermore, in the preferred embodiment, a comparison can be made among the grayscale values of an observed cell and its peripheral cells in the detection of the successive length of white cells, and a cell having a large grayscale value can be also detected as a white cell if a difference among the grayscale values is equal to or greater than a predetermined value.

In a preferred embodiment, a computer-readable portable storage medium on which is recorded a program for causing a computer to execute a process, the process comprising: a step of selecting input image data in units of rectangular blocks; a step of determining whether or not the selected block satisfies a predetermined condition; and a step of determining the type of code included in the block which satisfies the predetermined condition can be also used. The program further causes the computer to execute the process, the process further comprising: a rotation detecting step of determining whether or not the code determined to be one-dimensional code is in a rotated state in the code type determining step.

Additionally, as a storage medium used by a computer detecting a boundary of two-dimensional code where data put into cells is arranged in a two-dimensional state, a computer-readable portable storage medium on which is recorded a program for causing a computer to execute a process, the process comprising: a first white successive length detecting step of scanning input image data, and detecting a successive length of white cells; a second white successive length detecting step of scanning the input image data in a direction which intersects with the first white successive length, and detecting a white cell successive length which has an intersection with the first white successive length, and exceeds a predetermined length; and a step of detecting an intersection of the first white successive length and the second white successive length as a code boundary position can be also used.

BRIEF DESCRIPTION OF THE DRAWINGS

FIG. 1 explains a conventional method extracting a two-dimensional code region;

FIG. 3 exemplifies one-dimensional code and two-dimensional code;

FIG. 6 explains a method determining the presence/absence of rotation of one-dimensional code;

FIG. 9 is a flowchart showing the details of a one-dimensional code rotation determination process;

FIG. 11 is a flowchart showing the whole of a two-dimensional code recognition process in a second preferred embodiment;

FIG. 14 explains the detection of a quiet zone in the second preferred embodiment;

FIG. 15 explains a method detecting a cell width;

FIG. 17 explains a method detecting a second white successive length;

FIG. 21 explains the detection of code boundaries in 4 directions such as upward, downward, leftward, and rightward directions;

FIG. 22 explains a method setting a threshold value;

FIG. 27 explains the loading of programs according to the present invention into a computer.

DESCRIPTION OF THE PREFERRED EMBODIMENTS

Figure 2:
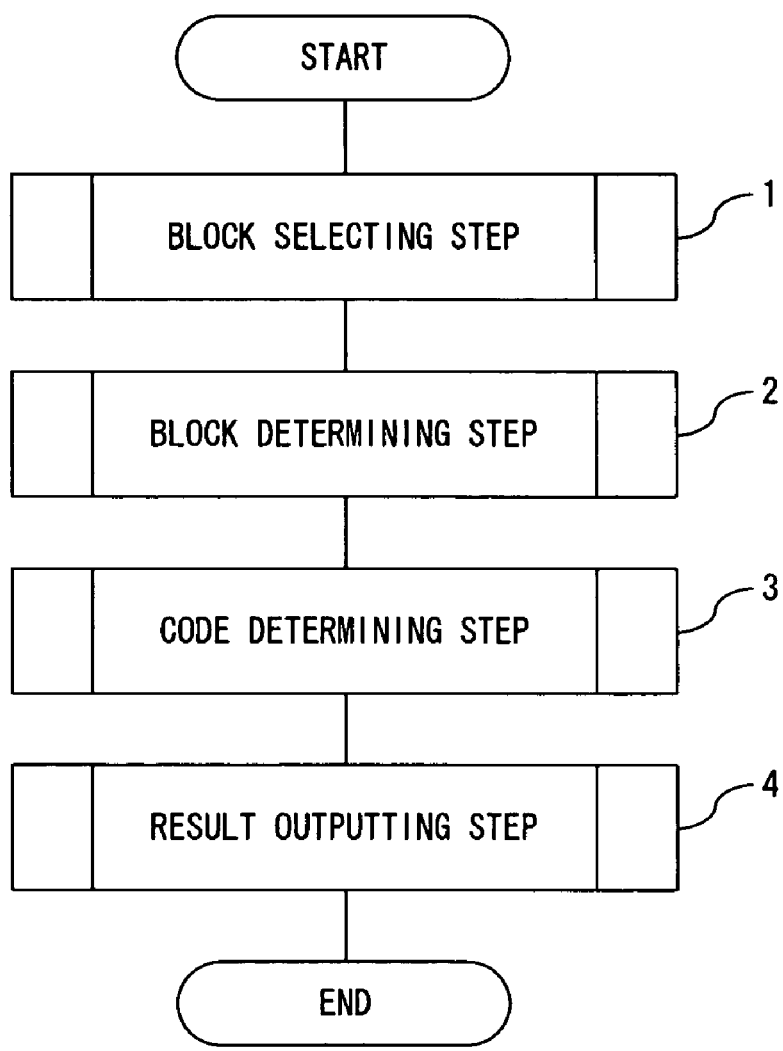
FIG. 2 explains the principle of a code type determining method according to the present invention.

FIG. 2 explains the principle of a code type determining method according to the present invention. In this figure, the code type determining method according to the present invention comprises: a block selecting step 1 of selecting input image data in units of rectangular blocks; a block determining step 2 of determining whether or not the selected block satisfies a predetermined condition; and a code determining step 3 of determining the type of code included in the block which satisfies the predetermined condition. The determined type of code, etc. is output by a result outputting step 4.

Initially, the code type determining method according to the present invention is described as a first preferred embodiment. FIG. 3 explains one-dimensional code and two-dimensional code as code types to which the code type determining method as the first preferred embodiment is applied. The one-dimensional code is a code implemented by combining parallel straight lines having different thicknesses and intervals, whereas the two-dimensional code is a code where data is put into cells, each of which normally corresponds to a plurality of pixels, and arranged in a two-dimensional state. The two-dimensional code shown in this figure is a two-dimensional code called a quick response (QR) code, which is characterized in that positioning symbols of the code exist in the upper right, the upper left, and the lower left of a code region. The existence of the positioning symbols enables the code to be quickly recognized. Actually, however, difficulties exist in finding the positioning symbols in many cases as described above.

In the first preferred embodiment, as described above, input image data is first partitioned in units of rectangular blocks, and it is determined whether each of the blocks includes either one-dimensional or two-dimensional code, or whether or not each of the blocks is at least part of such a code region. Thereafter, the type of the code, namely, whether the type of the code is either one-dimensional or two-dimensional code is determined. Code determination criteria are first described.

As shown in FIG. 3, both one-dimensional code and two-dimensional code are printed with two colors having a large contrast difference, such as white and black. Additionally, arrangements are made so that the ratio of areas of the two colors is close to 1 to 1 in a region within the codes. Accordingly, there is a characteristic such that the dispersion or the standard deviation of the grayscale values of pixels becomes large.

In the meantime, in a region where characters are printed, the ratio of the area of the color of the characters to that of their base color becomes small, and also the dispersion of the grayscale values of pixels becomes small. Additionally, in a region where a photograph, etc. is printed, the grayscale values of pixels take arbitrary values, and the dispersion of the grayscale values becomes small. A block where the dispersion of the grayscale values of pixels is within a predetermined range is detected by taking advantage of this characteristic, whereby a region including one-dimensional code or two-dimensional code can be detected.

Especially, within the two-dimensional code region, the code is created so that the ratio of areas of white to black colors falls within a predetermined range, for example, 50%±10%. By detecting a block where the ratio of white to black pixels falls within a predetermined range, especially, only the region including the two-dimensional code can be detected.

Figure 4:
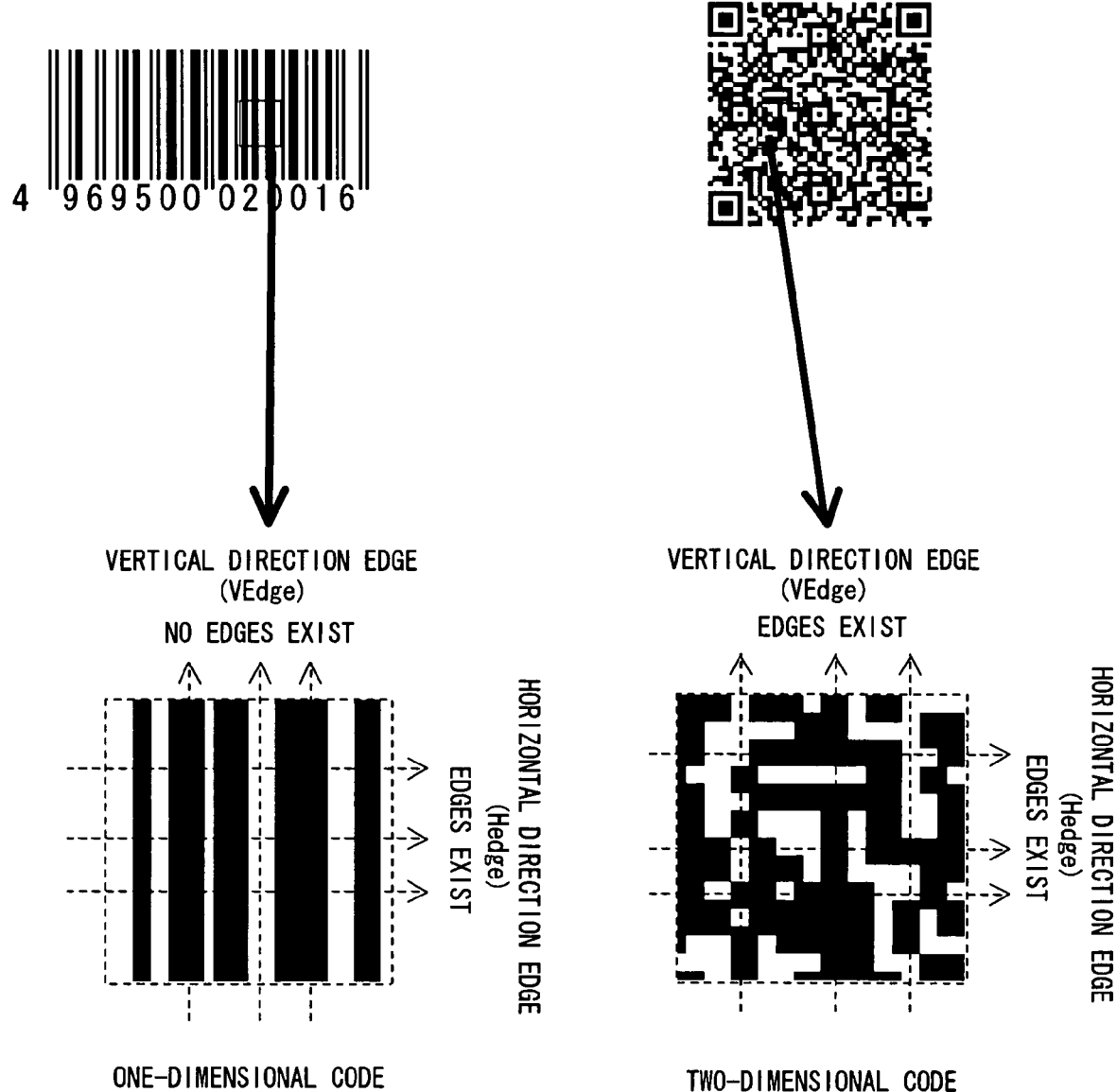
FIG. 4 explains a method determining the number of edges within a code.

FIG. 4 explains a determining method of the number of edges. One-dimensional code has a characteristic such that no edges exist when a pixel in a line parallel to a bar is extracted, whereas points (edges) at each of which the grayscale value of a pixel in a line suddenly changes exist in correspondence with the number of bars orthogonal to the line even if the line exists anywhere within the code when a pixel in a straight line, namely, a line vertical to a bar, is extracted, since the data of the one-dimensional code is represented by combining parallel straight lines.

In the meantime, two-dimensional code has a characteristic such that the number of edges who's points in which of which the grayscale value of a pixel suddenly changes does not differ much when a pixel in a line in the horizontal direction or in the vertical direction is extracted, since data is represented by combining light and dark dots (cells) arranged two-dimensionally, and the lightness and the darkness are made as even as possible within the code. Additionally, when a pixel in a line is extracted in a region where characters are printed, there are places such as between characters/lines, etc., in which no edge exists, and the characteristic of such a region is distinctly different from that of a code region.

Accordingly, in this preferred embodiment, a block where the number of edges in a horizontal/vertical line falls within a predetermined range is detected, whereby only a region including one-dimensional/two-dimensional code can be detected with high accuracy, and a distinction between one-dimensional code and two-dimensional code can be easily made.

Figure 5:
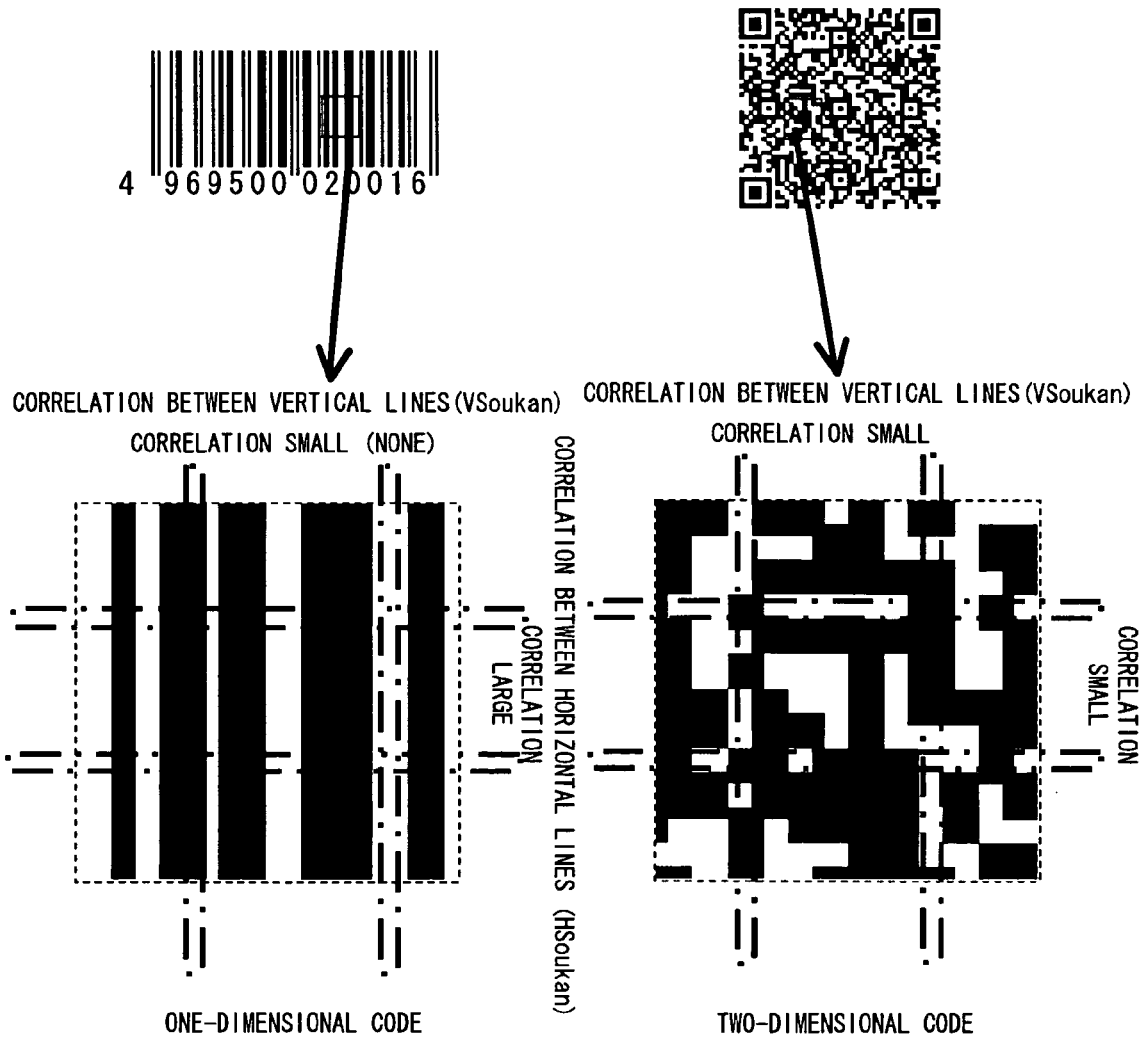
FIG. 5 explains a method determining a correlation between two lines within a code.

FIG. 5 explains a code determining method using a correlation between lines. One-dimensional code has a characteristic such that the value of a correlation between a straight line vertical to a bar and a parallel straight line in the vicinity of the straight line becomes large within a code region, but the value of a correlation between a straight line parallel to a bar and a parallel straight line in the vicinity of the straight line becomes small. In FIG. 5, two lines inside a black bar or a white bar are considered as two vertical lines. A case where a correlation is made between a line passing through the inside of a black bar and a line passing through the inside of a white bar is similar.

In the meantime, two-dimensional code has a characteristic such that the value of a correlation becomes small between two horizontal lines or between two vertical lines. Additionally, even in a region where characters or a photograph is printed, there are almost no cases where a correlation as strong as the case of one-dimensional code is exhibited.

Accordingly, a block where the value of a correlation between horizontal lines or between vertical lines in a block falls within a predetermined range is detected, whereby a region including one-dimensional/two-dimensional code can be detected with high accuracy, and at the same time, a distinction between one-dimensional code and two-dimensional code can be easily made.

FIG. 6 explains a method determining the presence/absence of rotation of one-dimensional code. As described above, for one-dimensional code, bar code recognition is originally made with data by one line in the direction orthogonal to a bar that forms the code. If the one-dimensional code is in a state of being rotated by 90 degrees, the direction of a line becomes parallel to that of the bar. Therefore, proper code recognition cannot be made. Accordingly, the presence/absence of rotation of the code must be detected.

In FIG. 6, if the one-dimensional code exists in the original direction, namely, in the horizontal direction, the number of horizontal direction edges exists by a number corresponding to the number of white and black bars, whereas the number of vertical direction edges becomes 0. Additionally, a correlation between horizontal lines becomes large, but a correlation between vertical lines becomes small.

In the meantime, if the one-dimensional code is rotated by 90 degrees, the number of horizontal direction edges is 0, whereas the number of vertical direction edges exists by a number corresponding to the number of white and black bars. Additionally, the value of a correlation between horizontal lines becomes small, whereas the value of a correlation between vertical lines becomes large.

Accordingly, whether one-dimensional code is either orientated in the horizontal direction or in a state rotated by 90 degrees within image data can be determined with high accuracy.

In actual code determination, only a region including one-dimensional code or two-dimensional code can be detected with high accuracy by appropriately combining a plurality of the above described determination conditions. Additionally, there are cases where value ranges that, especially, the number of white/black pixels, the number of edges, a correlation, etc. can possibly take may differ to some extent between one-dimensional code and two-dimensional code. This preferred embodiment is described by assuming that a process is executed without making a distinction between predetermined ranges of one-dimensional code and two-dimensional code. This eliminates the need for classifying respective determination processes, and a code determination can be quickly made with a simple process sequence.

Figure 7:
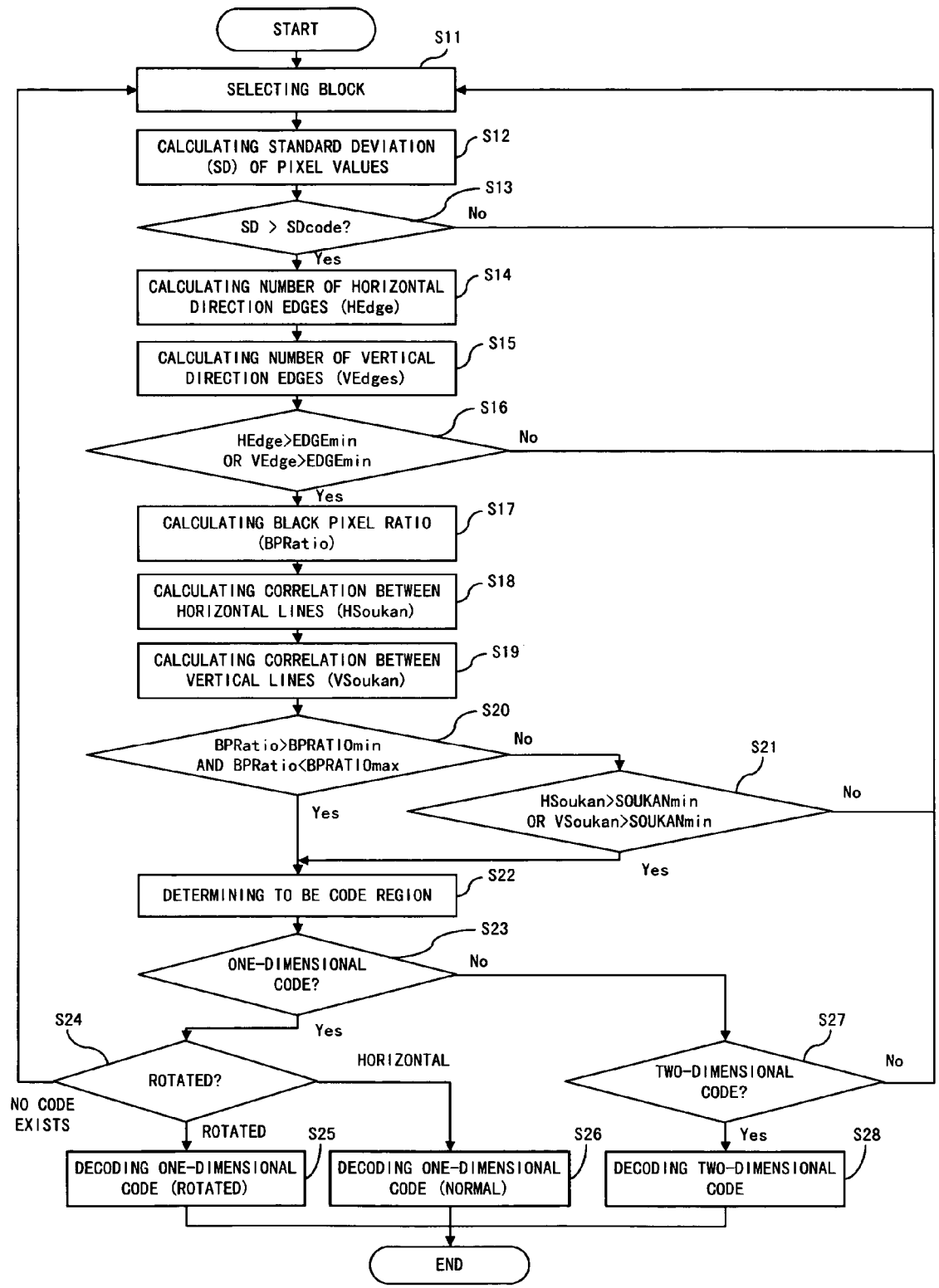
FIG. 7 is a flowchart showing the whole of a code type determination process in a first preferred embodiment.

A flowchart showing a code type determination process in a first preferred embodiment is described next with reference to FIGS. 7 to 10. FIG. 7 is a flowchart showing the whole of the code type determination process. Once the process is started in this figure, an observed block is first selected from input image data in step S11. Blocks are assumed to be sequentially selected from an arbitrary position of the image. Normally, blocks are selected by being sequentially scanned from an upper left corner, or from the center of the image to its peripheral part in many cases. From the viewpoint of a process target characteristic, selecting blocks from a position where code exists with great possibility enables the code to be detected immediately, and also enables a processing time to be shortened.

In step S12, a standard deviation (SD) of the grayscale values of pixels within the block is calculated. In step S13, it is determined whether or not the value of the standard deviation exceeds a predetermined value SDcode. If the value exceeds the predetermined value, the number of horizontal direction edges HEdge and the number of vertical direction edges VEdges are respectively calculated in steps S14 and S15. In step S16, it is determined whether or not these values exceed a predetermined value EDGEmin.

If either or both of the number of horizontal direction edges and the number of vertical direction edges exceed the predetermined value, a black pixel ratio BPRatio, a correlation between horizontal lines HSoukan, and a correlation between vertical lines VSoukan are respectively calculated in steps S17, S18, and S19. In step S20, it is determined whether or not the black pixel ratio exceeds a predetermined minimum value BPRATIOmin, and whether or not the black pixel ratio is smaller than a predetermined maximum value BPRATIOmax.

If this determination condition is satisfied, the block is determined to be a code region in step S22. Then, in step S23, it is determined whether or not the code region is one-dimensional code. This determination of one-dimensional code will be described in detail with reference to FIG. 8.

If the determination condition for the black pixel ratio is not satisfied in step S20, it is determined in step S21 whether the correlation between horizontal lines or the correlation between vertical lines exceeds a corresponding predetermined minimum value SOUKANmin. If either of the correlations exceeds the corresponding predetermined minimum value, the processes in and after step S22 are executed.

If the code region is determined to be one-dimensional code in step S23, it is further determined whether or not the one-dimensional code is in a rotated state in step S24. This determination will be further described in detail with reference to FIG. 9. If the one-dimensional code is determined to be in the rotated state, a decoding process is executed by recognizing that the one-dimensional code is rotated in step S25. If the one-dimensional code is determined not to be in the rotated state (in the horizontal direction), a decoding process is executed by recognizing that the one-dimensional code is in a normal state, namely, in the horizontal direction in step S26. Then, the process is terminated.

If the code region is determined not to be one-dimensional code in step S23, it is further determined whether or not the code region is two-dimensional code in step S27. If the code region is determined to be the two-dimensional code, a decoding process for the two-dimensional code is executed in step S28. Then, the process is terminated.

The decoding process for the two-dimensional code is executed based on a detection result after a code boundary is detected in a second preferred embodiment to be described later. By detecting a code boundary in correspondence with the position of a detected block, the decoding process for two-dimensional code can be made faster.

If the standard deviation is equal to or smaller than the predetermined value in step S13, if both of the number of horizontal direction edges and the number of vertical direction edges are equal to or smaller than the corresponding predetermined minimum values, if both of the correlation between horizontal lines and the correlation between vertical lines are equal to or smaller than the corresponding predetermined minimum values, and if the code region is determined not to be two-dimensional code respectively in steps S13, S16, S21, and S27, the process goes back to step S11, where the next block is selected, and the processes in and after step S12 are repeated. Fundamentally, there may be no cases where the code region is determined not to be two-dimensional code. However, if the code region is determined not to be two-dimensional code, the processes in and after step S11 are repeated by recognizing that some error occurs. Also if it is determined in step S24 that no code exists, this is recognized as an error, and the processes in and after step S11 are repeated.

Figure 8:
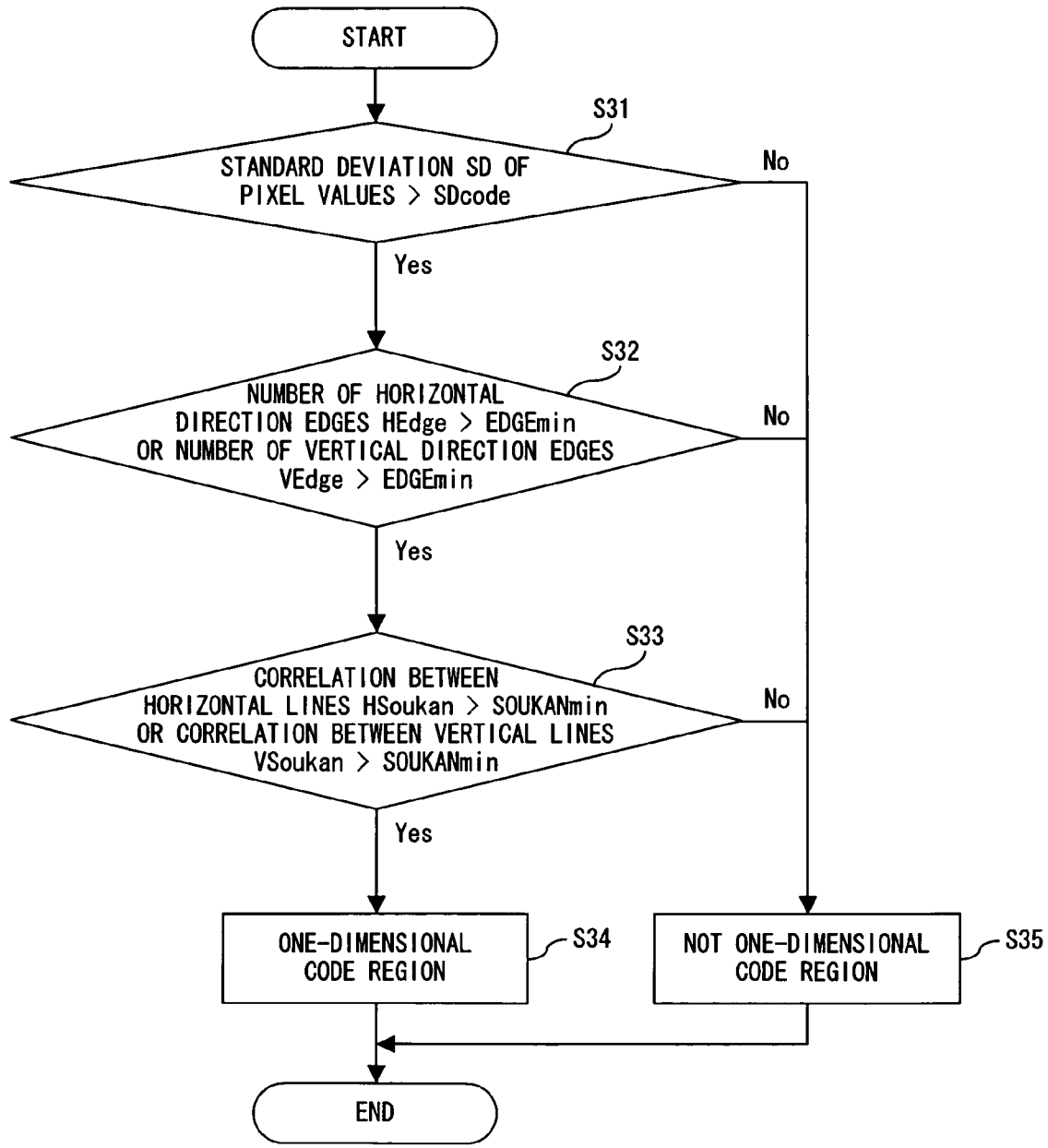
FIG. 8 is a flowchart showing the details of a one-dimensional code determination process.

FIG. 8 is a flowchart showing the details of the one-dimensional code determination process executed in step S23 of FIG. 7. Once the process is started in this figure, it is determined whether or not the standard deviation SD of grayscale values of pixels exceeds a predetermined value. This predetermined value is defined to be the same as that in step S13 of FIG. 17. If the standard deviation exceeds the predetermined value, it is further determined in step S32 whether or not at least either of the number of horizontal direction edges and the number of vertical direction edges exceeds a corresponding predetermined minimum value. Also this predetermined minimum value is defined to be the same as that in step S16.

If either of the numbers of edges exceeds the predetermined minimum value, it is further determined in step S33 whether or not the correlation between horizontal lines or the correlation between vertical lines exceeds a corresponding predetermined minimum value (the same as that in step S21). If the correlation exceeds the predetermined minimum value, the code region is determined to be a one-dimensional code region in step S34. Then, the process is terminated, and the flow transfers to step S24 of FIG. 7.

If the standard deviation, both of the numbers of horizontal and vertical directions edges, and both of the correlations between horizontal lines and between vertical lines are respectively determined to be equal to or smaller than their corresponding predetermined values in steps S31, S32, and S33, the code region is determined not to be one-dimensional code in step S35. Then, the process is terminated, and the flow transfers to the process in step S27 of FIG. 7.

FIG. 9 is a flowchart showing the details of the process for determining the presence/absence of rotation, which is executed in step S24 of FIG. 7. Once the process is started in this figure, it is first determined in step S37 whether or not the number of horizontal direction edges exceeds the predetermined minimum value, and whether or not the correlation between horizontal lines exceeds the predetermined minimum value. This determination is a condition under which one-dimensional code is in the horizontal direction as explained with reference to the left side of FIG. 6. If this condition is satisfied, it is determined in step S38 whether or not the number of vertical direction edges exceeds the predetermined minimum value, and whether or not the correlation between vertical lines exceeds the predetermined minimum value. This condition corresponds to the rotated state of one-dimensional code on the right side of FIG. 6. If this condition is not satisfied, the one-dimensional code is determined to be in the horizontal direction in step S41, and the flow transfers to the process in step S26 of FIG. 7.

If the determination condition in step S38 is satisfied, the one-dimensional code is in neither the horizontal direction nor the direction rotated by 90 degrees. This case corresponds, for example, to a case where the one-dimensional code is in a skew direction. In this case, it is determined in step S39 whether or not the correlation between horizontal lines HSoukan exceeds the correlation between vertical lines VSoukan. If the correlation between horizontal lines exceeds the correlation between vertical lines, the one-dimensional code is determined to be in the horizontal direction in step S41. Then, the flow transfers to the process in step S26.

If the determination condition is not satisfied in step S37, it is determined in step S40 whether or not the same determination condition as that in step S38 is satisfied. If the determination condition is satisfied, and if the correlation between horizontal lines is determined to be equal to or smaller than the correlation between vertical lines in step S39, the one-dimensional code is determined to be rotated in step S42. Then, the flow transfers to the process in step S25 of FIG. 7. Or, if the determination condition is not satisfied in step S40, it is determined in step S43 that no code exists, and some error is recognized to occur. Then, the processes in and after step S11 of FIG. 11 are repeated.

Figure 10:
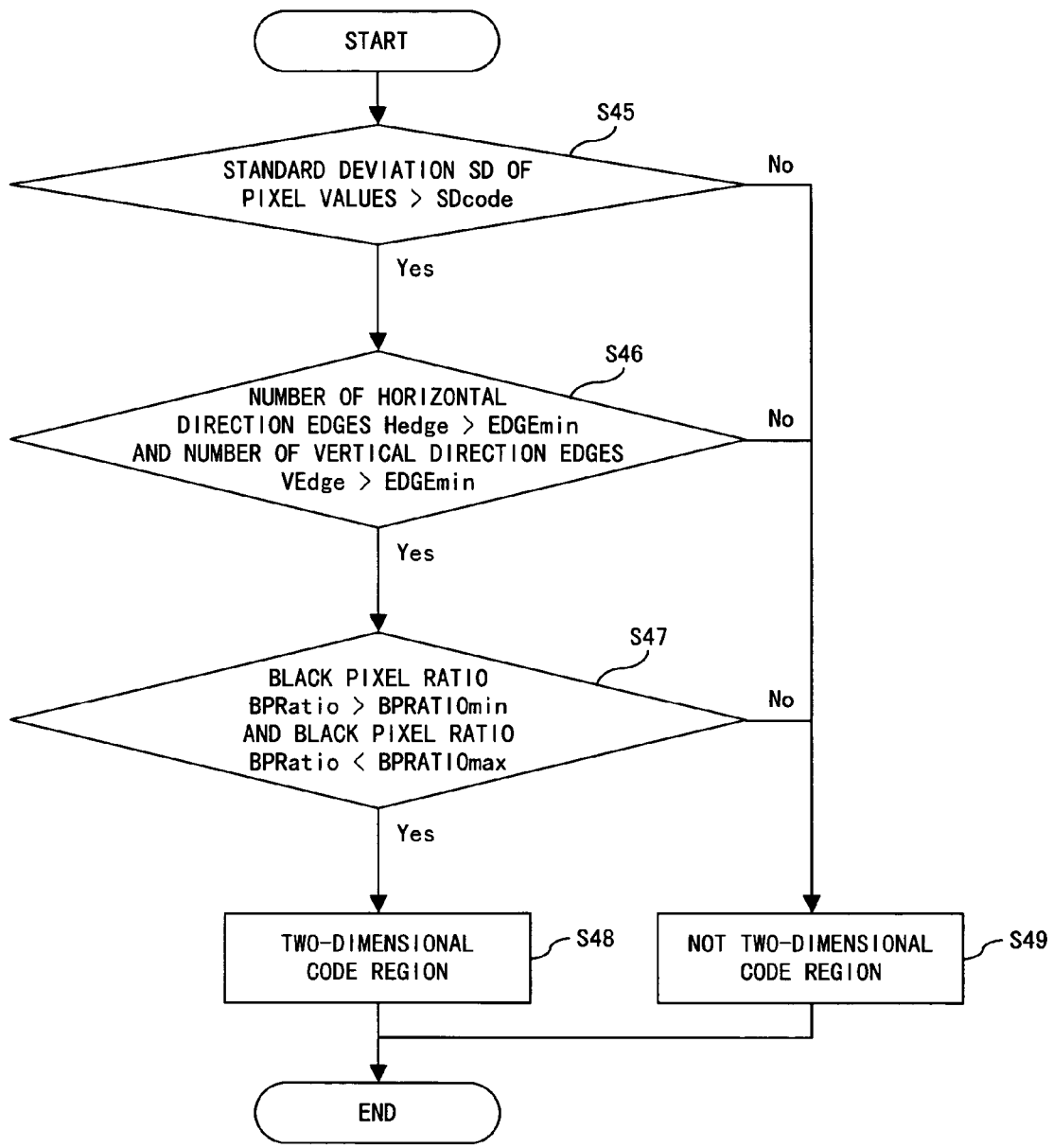
FIG. 10 is a flowchart showing the details of a two-dimensional code determination process.

FIG. 10 is a flowchart showing the details of the two-dimensional code determination process, which is executed in step S27 of FIG. 7. Once the process is started in this figure, it is determined in step S45 whether or not the standard deviation of grayscale values of pixels exceeds a predetermined value. If the standard deviation exceeds the predetermined value, it is further determined in step S46 whether or not both of the number of horizontal direction edges and the number of vertical direction edges exceed the corresponding predetermined minimum values. If both of the numbers of edges exceed the predetermined minimum values, it is further determined in step S47 whether or not the black pixel ratio exceeds the predetermined minimum value, and whether or not the black pixel value is smaller than the predetermined maximum value. If this condition is satisfied, the code region is determined to be two-dimensional code in step S48. Then, the flow transfers to the process in step S28 of FIG. 7. Or, if the standard deviation, and at least either of the number of horizontal direction edges and the number of vertical direction edges are respectively equal to or smaller than the predetermined values in steps S45 and S46, or if the black pixel ratio does not fall between the predetermined minimum and maximum values in step S47, the code region is determined not to be two-dimensional code in step S49, and the processes in and after step S11 are repeated.

In the above described flowchart, the determinations are made with the values common to the one-dimensional and the two-dimensional codes, for example, as the predetermined minimum values such as the number of horizontal direction edges, the number of vertical direction edges, etc. as stated earlier. However, as a matter of course, the processes can be executed by making a distinction of values between one-dimensional and two-dimensional codes as these predetermined values. Additionally, for example, the determination conditions in the one-dimensional code determination process in FIG. 8 are included in steps S13, S16, and S21 of FIG.

7, and the process for determining the presence/absence of rotation of one-dimensional code in step S24 can be also executed by determining that a block to be processed is a one-dimensional code region, for example, at a time point when the determination condition in step S21 is satisfied.

A second preferred embodiment according to the present invention is described next. In the second preferred embodiment, a boundary of two-dimensional code is detected in correspondence with a block determined to be two-dimensional code in the first preferred embodiment.

FIG. 11 is a flowchart showing the whole of a process for recognizing two-dimensional code in the second preferred embodiment. Once the process is started in this figure, an image is first read in step S51. In step S52, photoelectric conversion is made. In step S53, A/D conversion is performed. In step S54, a two-dimensional code recognition process is executed. In step S55, a data character output is made. Then, the process is terminated. The boundary detection of two-dimensional code as the second preferred embodiment is executed as part of the two-dimensional code recognition process in step S54.

Figure 12:
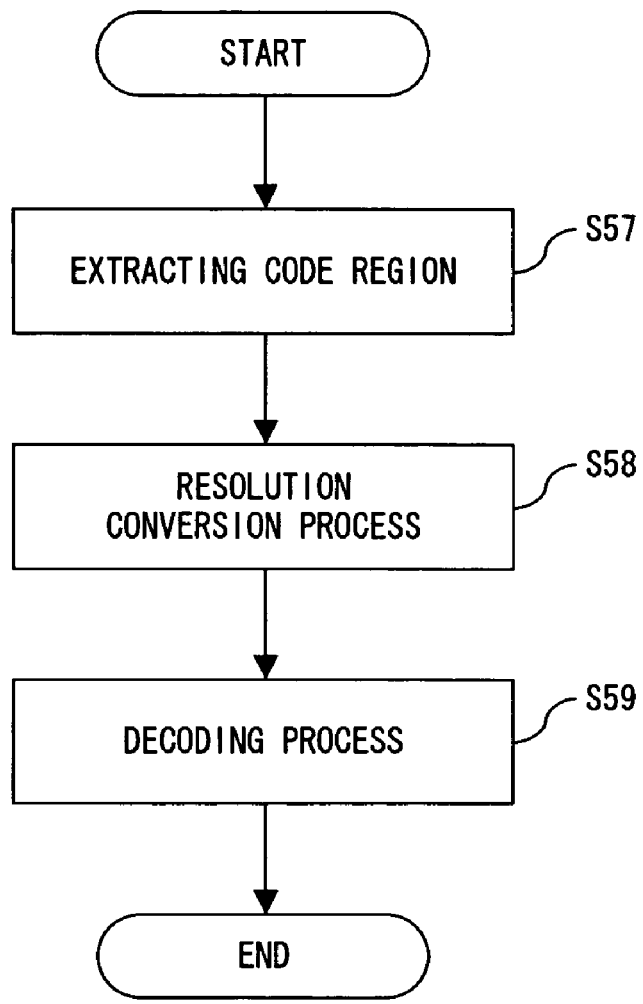
FIG. 12 is a flowchart showing the details of the two-dimensional code determination process.

FIG. 12 is a flowchart showing the two-dimensional code recognition process. Once the process is started in this figure, a code region extraction process, a resolution conversion process, and a decoding process are respectively executed in steps S57, S58, and S59. Then, the process is terminated. The boundary detection of a code region is included in the code region extraction process in step S57. In the resolution conversion process in step S58, a process for converting data of one cell of a code image into data of one pixel is executed. Namely, the resolution is converted by converting data of one cell, which corresponds to a plurality of pixels, into data of one pixel.

Figure 13:
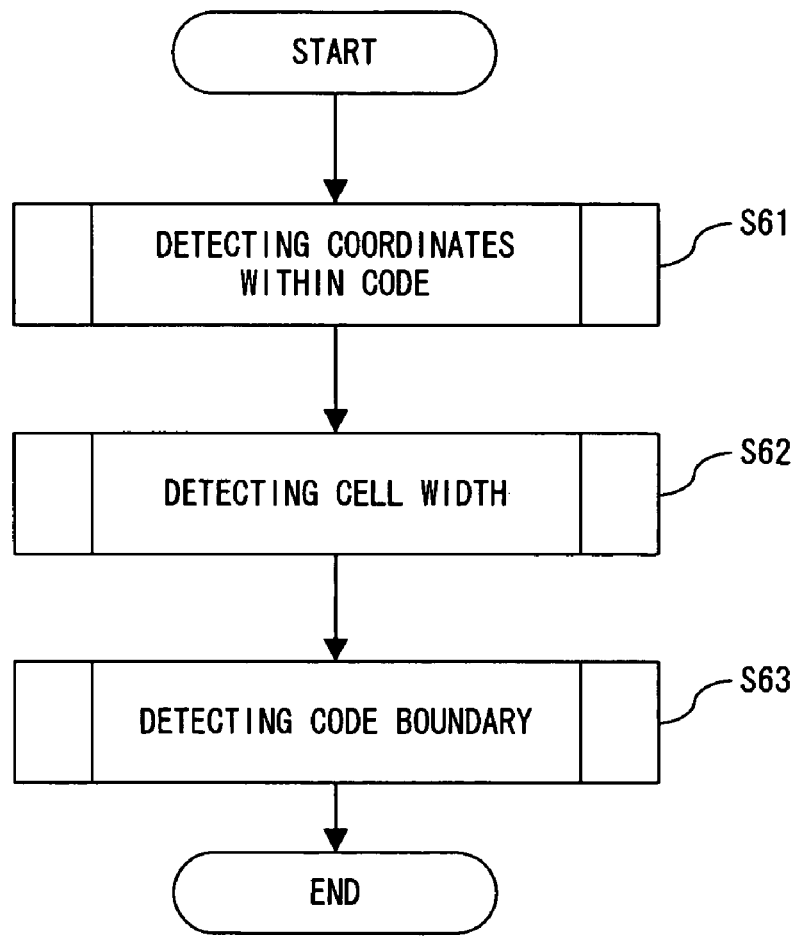
FIG. 13 is a flowchart showing the whole of a two-dimensional code boundary detection process.

FIG. 13 is a flowchart showing the code region extraction process in step S57. Once the process is started in this figure, coordinates of a point within a code region are first detected in step S61. In step S62, a cell width is detected. In step S63, a code boundary detection process is executed. Then, the process is terminated. The process in step S61 is executed in correspondence with the position of a block including two-dimensional code detected in the first preferred embodiment. The cell width detection process in step S62 will be described later.

FIG. 14 explains the principle of a method detecting a boundary of two-dimensional code in the second preferred embodiment. As described above, the positioning symbols of the QR code cannot be detected if an optical distortion or out-of-focus occurs. In this preferred embodiment, however, a boundary of two-dimensional code can be detected by detecting a white region that exists in the periphery of code, namely, a quiet zone. For example, in QR code, a white region (quiet zone) having a width of 4 cells exists in the periphery of the code. Since almost no influences are exerted on the quiet zone by an optical distortion or out-of-focus, a boundary of two-dimensional code can be accurately detected.

FIG. 15 explains a method detecting a cell width. In this figure, the successive lengths of white and black regions in upward, downward, leftward, and rightward directions are detected from a suitable point within two-dimensional code, and a distribution is obtained with the frequencies of the lengths. Then, a minimum successive length within a range where frequencies become equal or higher than a predetermined value is obtained as a cell width. Since a successive length which is not associated with a cell width is sometimes detected due to influences such as out-of-focus, noise, etc. within an image, a successive length having a small value is ignored, and a minimum successive length within a range where frequencies are equal to or higher than a particular value is obtained as a cell width. For two-dimensional code, its white and black cell widths are defined to be identical.

Figure 16:
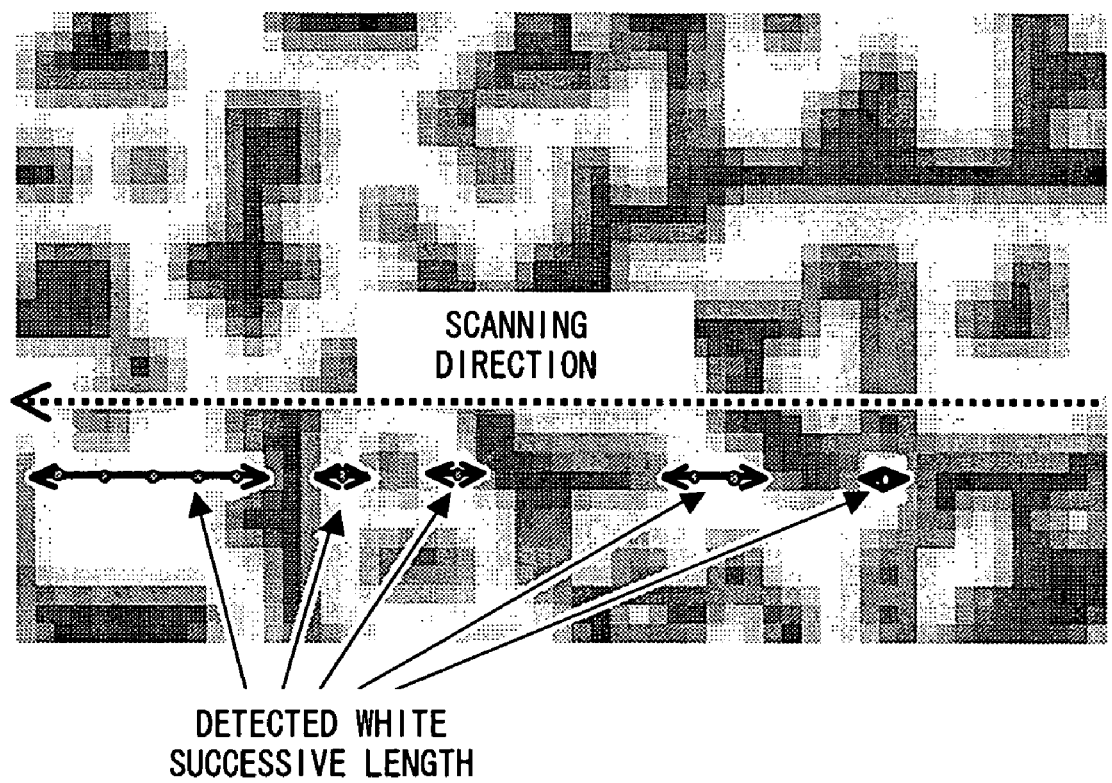
FIG. 16 explains a method detecting a first white successive length.

FIGS. 16 and 17 explain a method detecting first and second white successive lengths for detecting a code boundary. FIG. 16 explains a method detecting a first white successive length. In this figure, an image is scanned in any one of upward, downward, leftward, and rightward directions from a suitable point within two-dimensional code to detect a successive length of white cells. In FIG. 16, the image is scanned toward the left side, and 5 successive lengths are detected as first white successive lengths.

FIG. 17 explains a method detecting a second white successive length. Here, a second white successive length is detected in the direction that intersects with the white successive lengths detected in FIG. 16. A circle having a predetermined diameter is drawn by centering one point in the first white successive length. If all of points in a line segment which connects one point in the circumference and a point symmetric of that point with respect to the center are white, the line segment is detected as part of a second white successive length as will be described later.

If such a second white successive length is not detected in correspondence with respective points on the circumference of the predetermined diameter, which centers one point in the first white successive length, a process for moving the point as the center of the circle in the line segment of the first white successive length in FIG. 16, and for detecting a second white successive length in correspondence with a point on the circumference of the predetermined diameter, which centers the point, is repeated. This process is executed, for example, up to the leftmost position of the image including the two-dimensional code.

Figure 18:
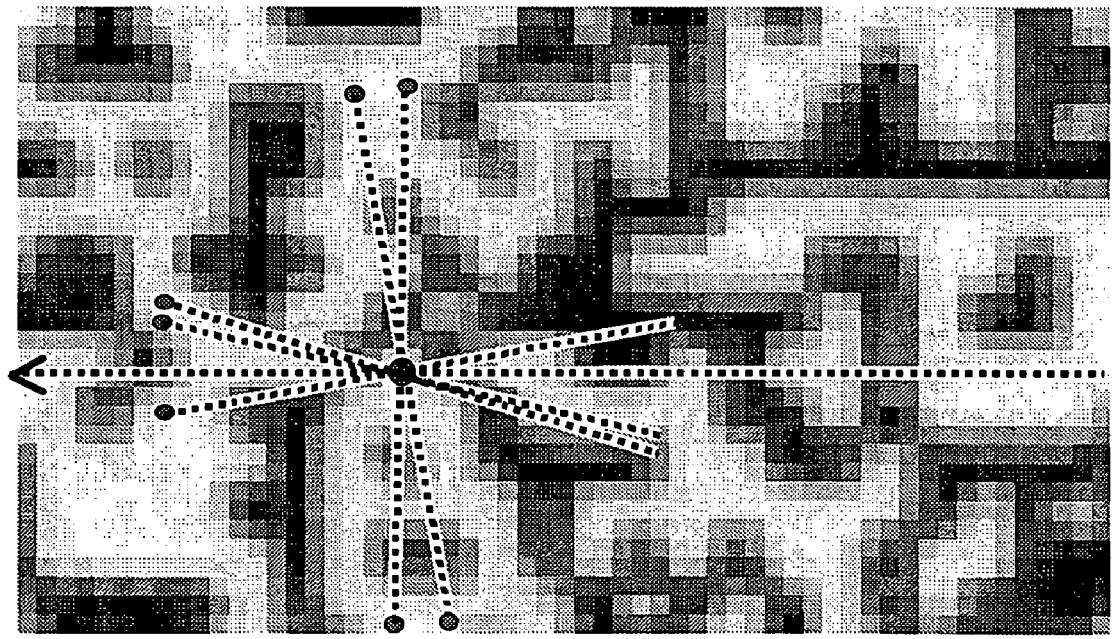
FIG. 18 explains an operation for detecting a second white successive length within a code.
Figure 19:
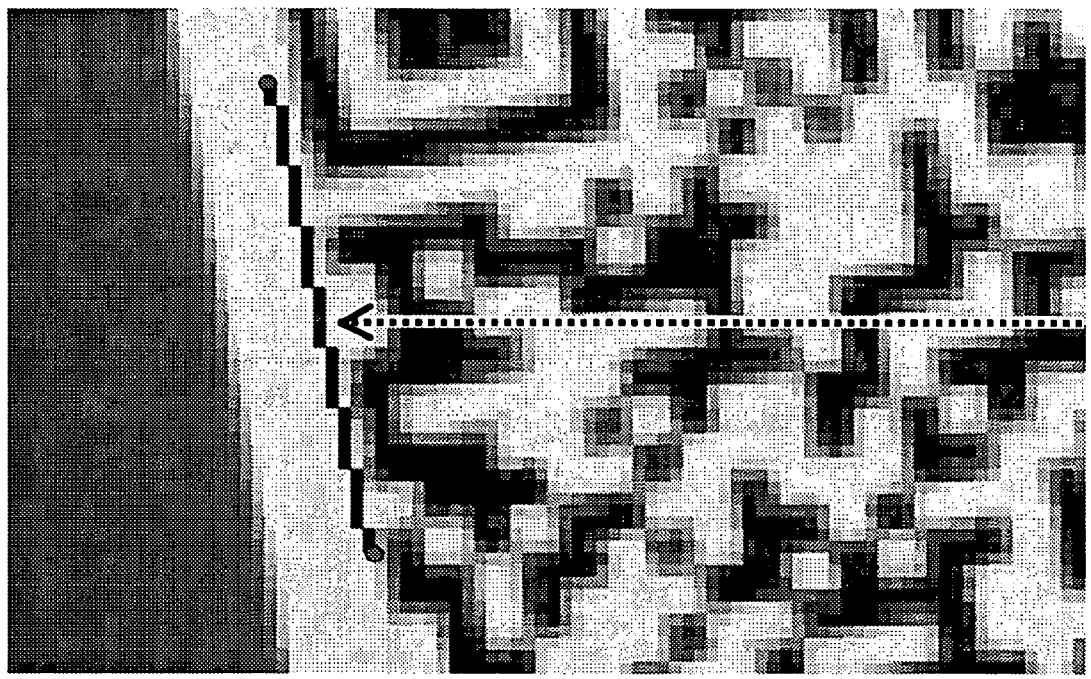
FIG. 19 explains an operation for detecting a second white successive length at a code boundary.

FIGS. 18 and 19 explain the method detecting a code boundary as a second white successive length. FIG. 18 explains an operation for detecting a second white successive length that targets points on a predetermined circumference, which centers a point in a first white successive length within a code. By increasing the diameter of the circle for detecting a second white successive length to a certain extent, such a long white successive length cannot be detected as a second white successive length within the code.

FIG. 19 explains an operation for detecting a second white successive length at a code boundary. Since a quiet zone exists at a code boundary as described above, a white successive length, which is equal to or longer than the diameter of a circle for detecting a second white successive length, can be detected. Actually, as will be described later, when such a white successive length that is the same as the diameter of the circle is detected, its line segment is extended to both sides, and it is detected whether or not all of points in the extended line segment are white. If all of the points are white, the line segment is detected to be a second white successive length in the quiet zone of the two-dimensional code.

Figure 20:
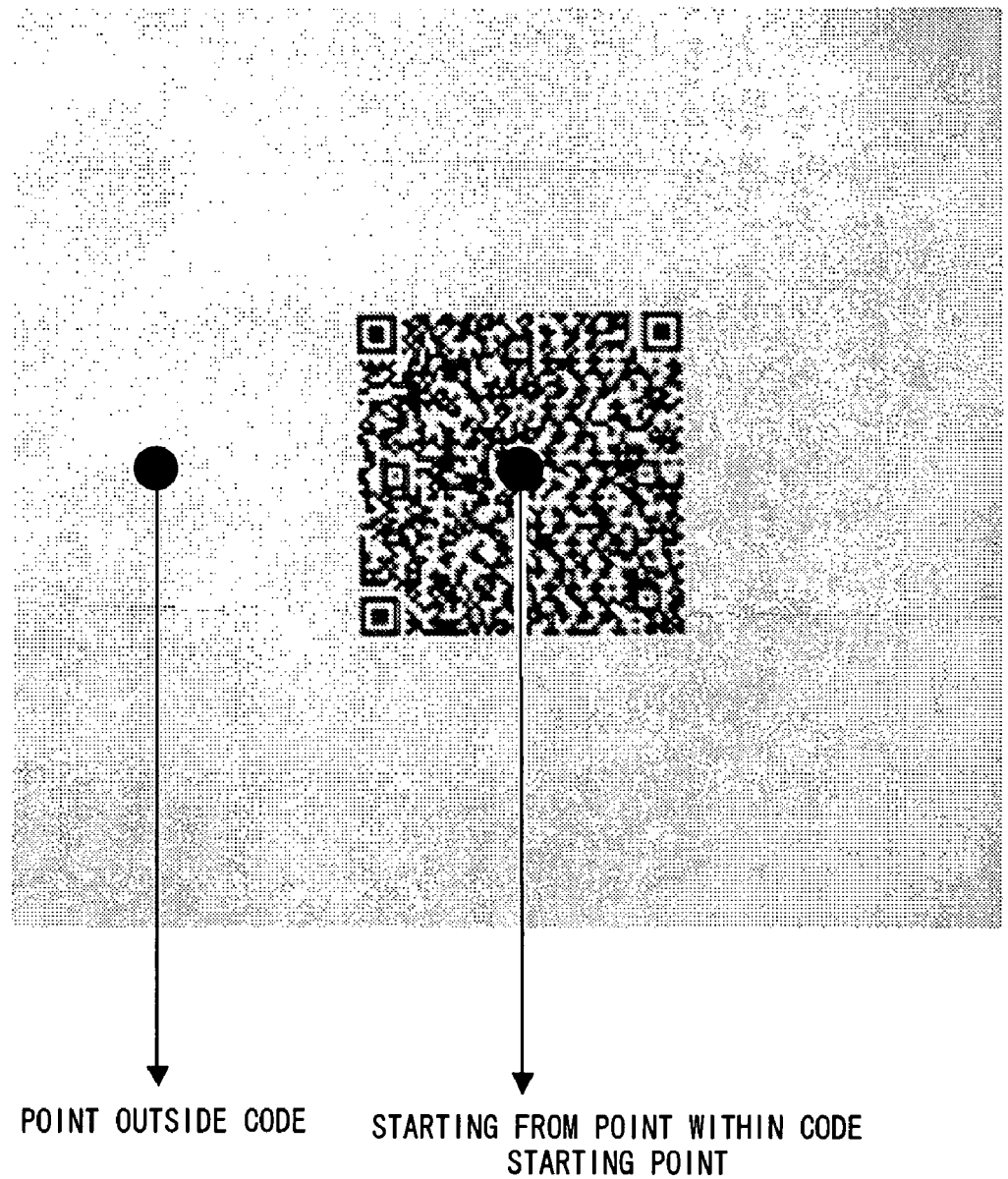
FIG. 20 explains the position of a starting point in a code boundary detection process.

FIG. 20 explains the position of a starting point in the boundary detection process. In the second preferred embodiment, the first white successive length detection process for detecting a code boundary is started by using a suitable point within code as a starting point. If a point outside the code is used as the starting point, the boundary detection process is executed in a graphic/chart or character region other than two-dimensional code. The position of the starting point is identified in correspondence with a block determined to be two-dimensional code in the first preferred embodiment.

FIG. 21 explains an operation for detecting 4 boundaries such as upward, downward, leftward, and rightward boundaries of two-dimensional code. As described above, an image is scanned respectively in the upward, downward, leftward, and rightward directions from the starting point of the boundary detection process, and a first white successive length and a second white successive length are detected, whereby the 4 boundaries such as upward, downward, leftward, and rightward boundaries corresponding to a quiet zone of the two-dimensional code are detected.

When the upward, downward, leftward, and rightward boundaries are detected in this way, a slope angle within the image of the two-dimensional code can also be obtained. For example, as its simplified method, a boundary is recognized as a straight line, and the slope angle of the code can be also obtained based on the slope angle of the straight line. As a more accurate method, the positions of positioning symbols are identified with a detection result of boundaries, and the slope angle of two-dimensional code can be also calculated from the positions.

FIG. 22 explains a method deciding a threshold value for making a distinction between white and black cells. If the irradiation amount of light beam for two-dimensional code is small, or if the sensitivity of a sensor is low, whether a cell is either black or white cannot be accurately determined in some cases when the threshold value is fixed, for example, to 128, the median of 256 grayscales. For example, if the irradiation amount of light beam is small, the range of grayscale values becomes a low level as a whole, and faintness or blurriness occurs. The method deciding a threshold value, which is shown in FIG. 22, is used in the second preferred embodiment in order to eliminate influences such as faintness or blurriness.

Normally, most two-dimensional codes are represented by binary values of white and black. In a histogram of grayscale values for respective cells of an input image, two peaks occur in light and dark regions as shown in FIG. 22. If frequencies are respectively equal to or higher than a corresponding predetermined value, and if a median (average value) of the grayscale values which respectively correspond to the peaks of the leftmost and the rightmost grayscale values is decided as a threshold value, the influences of faintness and blurriness are eliminated, and the determination of white and black cells can be accurately made.

As the method determining black and white cells, instead of using such a threshold value, also a method making a comparison among the grayscale values of an observed cell and its peripheral cells, and respectively determining a cell having a large grayscale value and a cell having a small grayscale value to be white and black cells if the difference among the grayscale values is equal to or greater than a predetermined value is also available.

Figure 23:
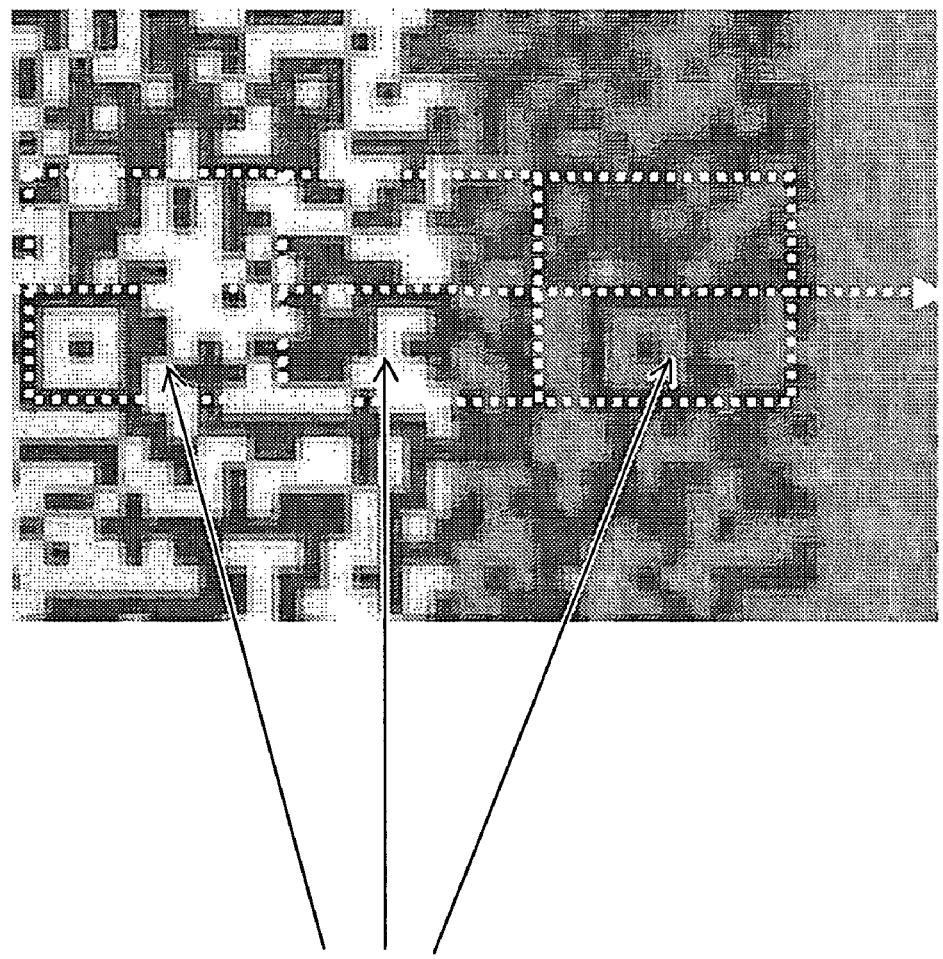
FIG. 23 explains a method deciding a threshold value for each region.

FIG. 23 explains an operation for updating a threshold value when it is used. If a predetermined threshold value is used for the entire image region of two-dimensional code in order to determine black and white cells, an accurate determination cannot be made due to the size of an image region of two-dimensional code, an influence of a shade caused by the irradiation direction of light beam, etc. in some cases. Namely, if dark and light shade portions are caused by influences such as the position of a light beam source, etc., a determination of black and white cells must be made by changing a threshold value respectively for the dark and light shade portions.

For example, if the image is scanned in the right direction in FIG. 21, the process for detecting a first white successive length, and the process for detecting a second white successive length are executed by modifying the threshold value, for example, at each predetermined distance. As the scanning distance for which the threshold value modification is made, a suitable distance can be decided by repeating an experiment, for example, with a change in the position, the intensity, etc. of a light beam source.

Figure 24:
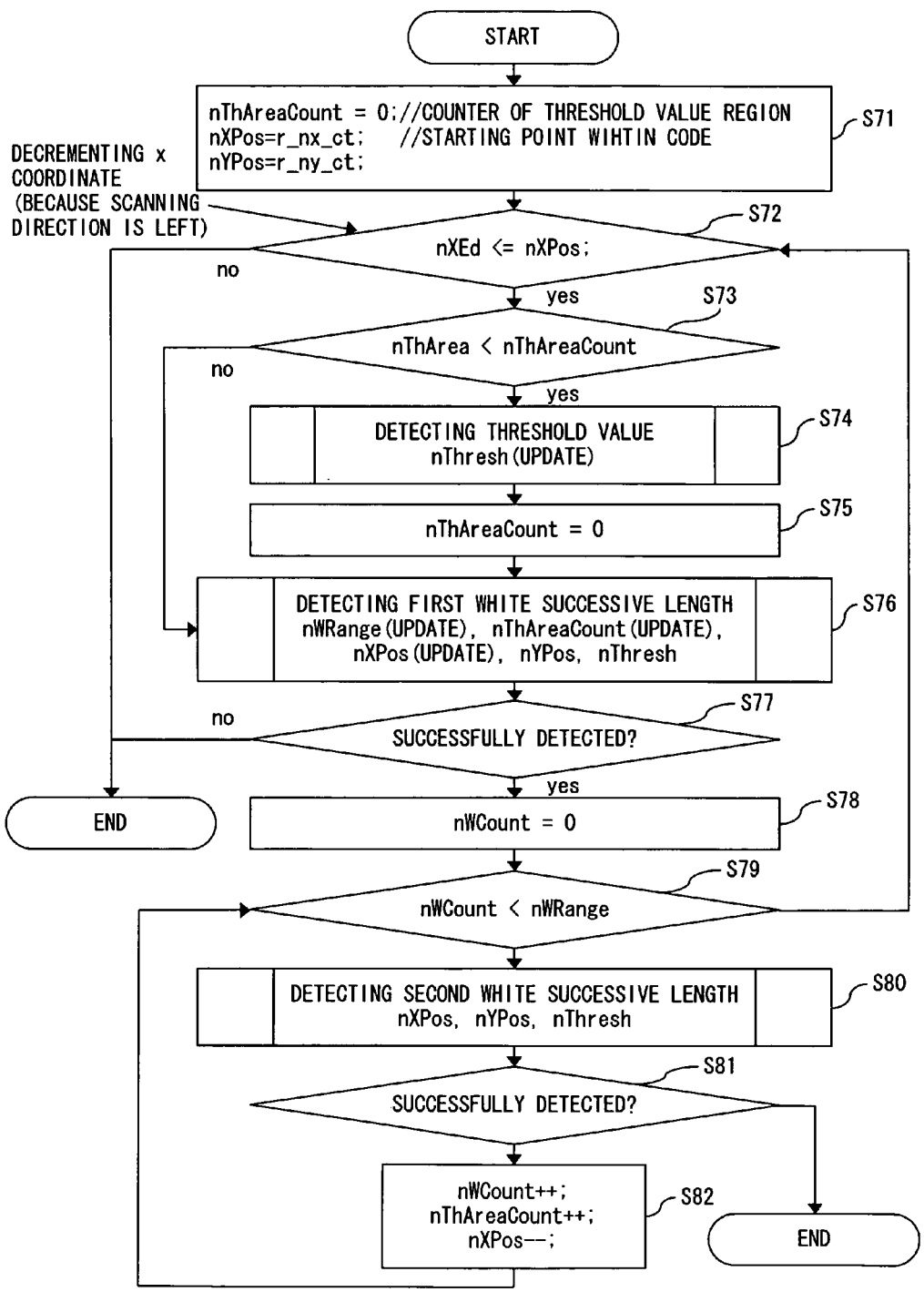
FIG. 24 is a flowchart showing the whole of the code boundary detection process.

The two-dimensional code boundary detecting method the outline of which is described above is further explained in detail with reference to flowcharts shown in FIGS. 24 to 26. FIG. 24 is a flowchart showing the whole of the code boundary detection process. Two-dimensional code to be detected here is assumed to be, for example, the above described QR code. However, the process can be executed also for other two-dimensional codes. The QR code is described in detail by the following document.

[Non-patent Document 1]: JIS XO510 "Two-dimensional Code Symbol—QR Code—Basic Specifications Description"

Once the process is started in FIG. 24, firstly in step S71, a counter of a threshold value region corresponding to a distance for which the threshold value is updated is initialized to 0, and coordinates r-nx-ct and r-ny-ct of a scanning starting point within a code, namely, a point within a two-dimensional code region detected in the first preferred embodiment are respectively assigned to coordinates nXPos and nYPos of a point currently being processed. Then, in step S72, it is determined whether or not the X coordinate nXPos of the current point is equal to or larger than the X coordinate nXEd (=0) of the leftmost point of the image. Here, the flowchart showing the process is described by assuming that the image is scanned from the starting point toward the left direction as described with reference to FIG. 21.

If it is determined in step S72 that the current point does not reach the leftmost point of the image, it is determined in step S73 whether or not the value of the counter of the threshold value region exceeds a value nThArea, for which an update is to be made. If the value of the counter exceeds the value nThArea, the threshold value detection process is executed to update the threshold value nThresh in step S74. The threshold value detection process is executed with the method described with reference to FIG. 22.

Succeeding the process in step S74, the process goes to a first white successive length detection process in step S76 if the value of the counter does not exceed the value, for which an update is to be made, after the value of the counter of the threshold value region is initialized to 0 in step S75. Although this process will be described in detail with reference to FIG. 25, nWRange which indicates a first white successive length, the value of the counter of the threshold value region, the coordinates values of the current point, and a variable value of the threshold value nThresh are passed in correspondence with this process. Values other than the Y coordinate nYPos of the current point and the threshold value nThresh among these values are updated in the first white successive length detection process. The value of the counter of the threshold value region can possibly exceed the value of nThArea while the first white successive length detection process is executed. Here, it is assumed that the first white successive length is relatively short, and the threshold value is not updated during this process.

Upon termination of the first white successive length detection process, it is determined in step S77 whether or not a white successive length is not detected in the first white successive length detection process and an error occurs. If it is determined that an error occurs, the process is terminated. If a first white successive length is successfully detected, a count value nWCount used for a process for determining the termination of second white successive length detection is initialized to 0 in step S78. In step S79, it is determined whether or not the count value is smaller than nWRange that indicates a first white successive length. If the count value is smaller than nWRange, a second white successive length is detected in step S80. Although this process will be described in detail with reference to FIG. 26, the X and Y coordinates of the current point, and the threshold value are passed in correspondence with this process.

Then, in step S81, it is determined whether or not a second white successive length is successfully detected. If the second white successive length is successfully detected, the process is terminated. If the second white successive length is unsuccessfully detected, the processes in and after step S79 are repeated after nWCount and the value of the counter of the threshold value region are incremented, and the X coordinate of the current point is decremented in step S82.

Namely, as described with reference to FIGS. 16 and 17, the second white successive length detection process is repeated while the current point is moved in the line segment that corresponds to the first white successive length in the left direction. The repetition of this process is terminated when the value of nWCount reaches the value of the first white successive length, namely, nWRange in step S79. Then, the processes in and after step S72 are repeated.

Figure 25:
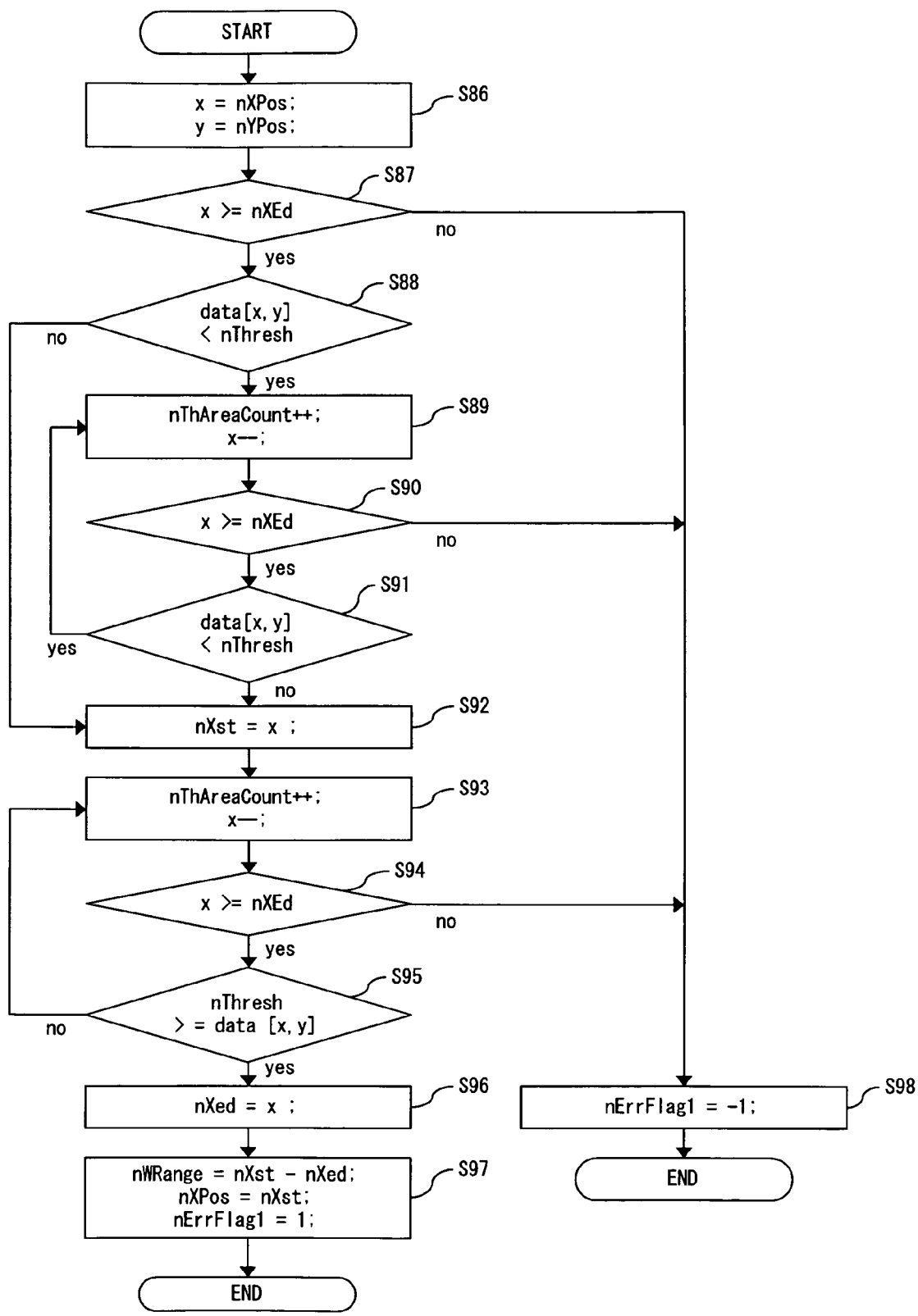
FIG. 25 is a flowchart showing the details of a first white successive length detection process.

FIG. 25 is a flowchart showing the details of the first white successive length detection process. Once the process is started in this figure, the X and Y coordinates of a current point are assigned to variables x and y in step S86. In step S87, it is determined whether or not x reaches the leftmost point of image data. If x does not reach the leftmost point, it is further determined in step S88 whether or not data of the grayscale value of the point having the coordinates x and y is smaller than the threshold value. Since a grayscale value of a light cell, namely, a white cell is larger than that of a black cell in this preferred embodiment, the grayscale value being smaller than the threshold value means that a cell currently being processed is proved to be black. Therefore, the processes in steps S89 to S91 are repeated until a white cell is detected.

In step S89, the value of a counter of a threshold value region is incremented, and the coordinate x of the cell being processed is decremented. Then, in step S90, it is determined whether or not the coordinate x reaches the leftmost point of the image in a similar manner as in step S87. If the coordinate x does not reach the leftmost point, it is determined in step S91 in a similar manner as in step S88 whether or not the grayscale value is smaller than the threshold value. If the coordinate x is smaller than the threshold value, the processes in and after step S89 are repeated.

If the grayscale value is equal to or larger than the threshold value in step S91, and if the grayscale value is equal to or larger than the threshold value in step S88 in a similar manner, the coordinate x of the cell being processed is assigned to nXst which indicates the X coordinate of the starting point of a first white successive length in step S92, and the process goes to step S93.

Then, in steps S93 to S95, it is determined whether or not the cell being processed reaches the leftmost point of the image, and whether or not the cell is white after the value of the counter of the threshold value region is incremented and the X coordinate x of the cell being processed is decremented. If both of these determinations are satisfied, these processes are repeated. If the grayscale value of the cell is determined to be equal to or smaller than the threshold value and the cell is determined to be black in step S95, the X coordinate x of the cell is assigned to nXed, which indicates the X coordinate of the end point of the first white successive length in step S96. In step S97, nWRange which indicates a first white successive length is obtained, and the value of nXPos which indicates the X coordinate of the cell being processed in the entire process shown in FIG. 24 is recognized as the coordinate nXst of the starting point of the first white successive length, and the value of a flag nErrFlag1, which indicates the successful detection of the first white successive length, is set to 1. Then, the process is terminated, and the flow returns.

If x which indicates the X coordinate of the cell being processed is determined to reach the leftmost point nXEd of the image data in any of steps S87, S90, and S94, the flag which indicates the successful detection of the first white successive length is set to −1, namely, a value which indicates unsuccessful detection in step S98. Then, the process is terminated, and the flow returns.

Figure 26:
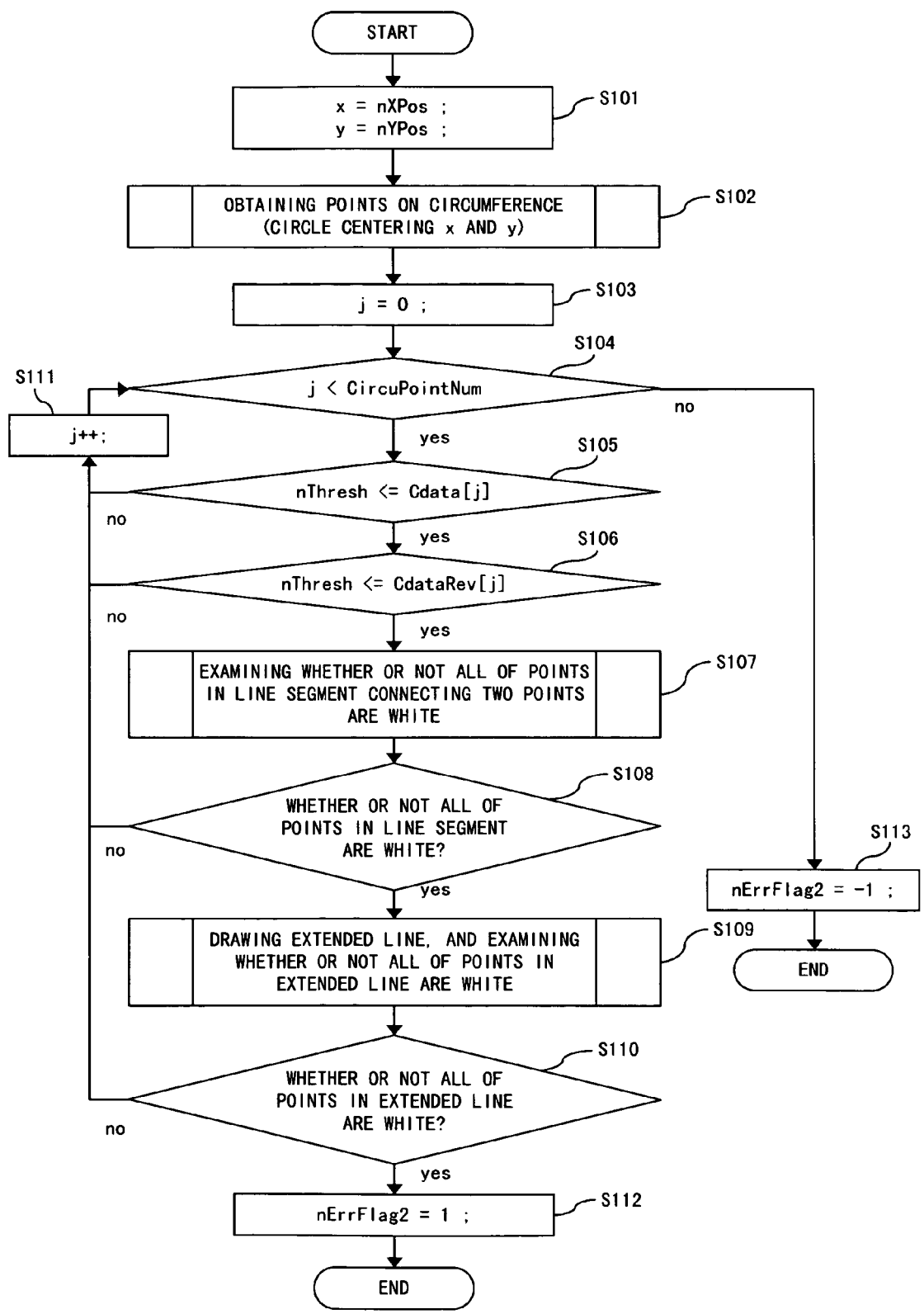
FIG. 26 is a flowchart showing the details of a second white successive length detection process.

FIG. 26 is a flowchart showing the details of the second white successive length detection process, which is executed in step S80 of FIG. 24. Once the process is started in this figure, firstly in step S101, the coordinates x and y of the cell currently being processed are set in a similar manner as in step S86 of FIG. 25. In step S102, a circle that centers the point determined by these coordinates is drawn, and points on its circumference are obtained. Here, the circle is intended to detect a second white successive length as described above, and a circle having a diameter of a certain length is used as this circle in order not to detect a second white successive length within code.

Then, in step S103, j as the index of a point on the circumference is initialized to 0. In step S104, it is determined whether or not the value of j is smaller than the number of points on the circumference CircuPointNUm, which are obtained in step S102. If the value of j is smaller than the number CircuPointNum, it is determined whether or not the grayscale value Cdata[j] at the point on the circumference, which is indicated by the index j, is equal to or larger than the threshold value in step S105. If the grayscale value is equal to or larger than the threshold value, namely, the point is white, it is determined whether or not a grayscale value CdataRev[j] of a point located in a position symmetric of the point on the circumference, which is indicated by the index j, with respect to the center of the circle, is equal to or larger than the threshold value in step S106. If the grayscale value is determined to be equal to or larger than the threshold value, colors of all of points in a line segment that connects these two points are examined in step S107. Then, in step S108, it is determined whether or not the colors of all of the points are white. If colors of all of the points are white, an extended line is drawn outside the line segment as described above, and it is examined whether or not colors of all of points in the extended line are white in step S109. It is determined in step S110 whether or not the colors of all of the points in the extended line are white. If the colors of all of the points are white, the value of a flag nErrFlag2, which indicates the successful detection of a second white successive length, is set to 1 in step S112. Then, the process is terminated, and the flow returns. The length of the extended line drawn in step S109 is set as a length such that the length of the entire line segment that includes the length of the extended line becomes, for example, a length obtained by doubling the diameter of the circle.

If the point, which is indicated by the index j, on the circumference, or the grayscale value of the point symmetric of that point with respect to the center of the circle is equal to or smaller than the threshold value in step S105 or S106, or if some of the points in the line segment or some of the points in the extended line are not white in step S108 or S110, the processes in and after step S104 are repeated after the value of j is incremented in step S111. Namely, the second white successive length detection process is continued while the points on the circumference, which are obtained in step S102, are moved. If the process for all of the points on the circumference is determined to be terminated, this means that a second white successive length is unsuccessfully detected. Therefore, the value of the flag is set to −1 in step S113. Then, the process is terminated, and the flow returns.

Up to this point, the code type determining method and the code boundary detecting method according to the present invention are described in detail. A code reading device executing these methods can be configured with a normal computer system as its main constituent part, as a matter of course. FIG. 27 is a block diagram showing the configuration of such a computer system, namely, a hardware environment.

In FIG. 27, the computer system is configured by a central processing unit (CPU) 10, a read-only memory (ROM) 11, a random access memory (RAM) 12, a communications interface 13, a storage device 14, an input/output device 15, and a portable storage medium reading device 16, which are interconnected by a bus 17.

As the storage device 14, a storage device in various forms, such as a hard disk, a magnetic disk, etc. is available. The programs represented by the flowcharts shown in FIGS. 7 to 10, 11 to 13, and 24 to 26 and stored in such a storage device 14 or ROM 11, or the programs stored onto a storage medium according to claims 16 and 18 are executed by the CPU 10, whereby the detection of a block including one-dimensional/two-dimensional code, and the code type determination in this preferred embodiment can be implemented.

Such programs can be stored, for example, in the storage device 14 via a network 19 and the communications interface 13 from the side of an information provider 18, or onto a marketed and distributed portable storage medium 20, set in the reading device 16 and executed by the CPU 10. As the portable storage medium 20, a storage medium in various forms, such as a CD-ROM, a flexible disk, an optical disk, a magneto-optical disk, a DVD, etc. may be available. The programs stored onto such a storage medium are read by the reading device 16, whereby the two-dimensional code boundary detection, and the like in this preferred embodiment can be implemented.

With the code type determining method according to the present invention, not only the position of one-dimensional/two-dimensional code; but also a type distinction between one-dimensional code and two-dimensional code, and the presence/absence of rotation if the type is one-dimensional code can be automatically detected, even if the one-dimensional/two-dimensional code is arranged along with a document or a graphic/chart. Therefore, an optimum method according to the type or the characteristic of code can be automatically selected in a subsequent recognition process, and the shortening of reading process time of one-dimensional/two-dimensional code, and improvements in recognition accuracy can be implemented.

Additionally, with the code boundary detecting method according to the present invention, a quiet zone on which almost no influences such as an optical resolution, an optical distortion, out-of-focus, etc. are exerted is detected, whereby a boundary of two-dimensional code can be accurately detected. This greatly contributes to improvements in the recognition process efficiency of one-dimensional/two-dimensional code by being combined with the above described code type determining method.

The present invention is available, to say nothing of, to an industry which manufactures a code recognition device, by way of example, for optically reading one-dimensional bar code or two-dimensional code and for recognizing the code, and also to all of industries that use such one-dimensional/two-dimensional code.

What is claimed is:

1. A code type determining method, comprising:
   selecting input image data in units of rectangular blocks;
   first determining whether or not the selected block satisfies a predetermined condition; and
   second determining a type of code included in the block which satisfies the predetermined condition, wherein a distinction between one-dimensional code and two-dimensional code is made as a type of code in said second determining wherein the method is implemented by a computer.

2. The code type determining method according to claim 1, further comprising:
   determining whether or not the one-dimensional code is in a rotated state when the type of the code is determined to be -one-dimensional code.

3. The code type determining method according to claim 1, wherein:
   whether or not dispersion of grayscale values of pixels within a block is within a predetermined range is determined as the predetermined condition in said first determining.

4. The code type determining method according to claim 1, wherein:
   whether or not a ratio of black pixels to white pixels within a block is within a predetermined range is determined as the predetermined condition in said first determining.

5. The code type determining method according to claim 1, wherein
   whether a number of edges at each of which a grayscale value of a pixel suddenly changes in a line in a horizontal direction or a vertical direction within a block is within a predetermined range is determined as the predetermined condition and/or a code type determination condition in said first determining and/or said second determining.

6. The code type determining method according to claim 1, wherein:
   whether a correlation of grayscale values of pixels between two or more horizontal lines, and/or between two or more vertical lines within a block is within a predetermined range is determined as the predetermined condition and/or a code type determination condition in said first determining and/or said second determining.

7. A method detecting a boundary of two-dimensional code where data put into cells is arranged in a two-dimensional state, comprising:
   a first white successive length detecting step of scanning input image data, and detecting a successive length of white cells;
   a second white successive length detecting step of scanning the input image data in a direction which intersects with a first white successive length, detecting a second successive length of white cells, which has an intersection with the first white successive length and exceeds a predetermined length, drawing an extended line of the detected second successive length, and determining whether or not colors of all of points in the extended line are white; and
   a boundary detecting step of detecting an intersection of the first white successive length and a second white successive length as a code boundary position one the colors of all of points in the extended line are white wherein the method is implemented by a computer.

8. The code boundary detecting method according to claim 7, wherein:

the input image data is scanned in an upward, downward, leftward, or rightward direction from a point within a code in correspondence with a position of the code, which is identified beforehand, in said first white successive length detecting step; and an upward, downward, leftward, or rightward code boundary is detected in said boundary detecting step.

9. The code boundary detecting method according to claim 7, further comprising a cell width detecting step of detecting a cell width, wherein a successive length is decided by using the detected cell width as a reference in detection of the successive length of white cells.

10. The code boundary detecting method according to claim 9, wherein:

said cell width detecting step comprises a step of scanning input image data in an upward, downward, leftward, or rightward direction from a point within a code in correspondence with a position of the code, which is identified beforehand, and creating a histogram which indicates a frequency of a successive length of white cells and/or a successive length of black cells, a step of deciding a minimum successive length as a cell width among successive lengths having a frequency equal to or greater than a predetermined value in the histogram.

11. The code boundary detecting method according to claim 7, further comprising a threshold value deciding step of deciding a threshold value used in detection of the successive length of white cells, wherein a cell having a grayscale value equal to or larger than the threshold value is detected as a white cell.

12. The code boundary detecting method according to claim 11, wherein in said first white successive length detecting step, said threshold value deciding step is repeated for each scanning at a predetermined distance when the input image data is scanned, and a cell having a grayscale value equal to or larger than the threshold value updated by the repetition is detected as a white cell.

13. The code boundary detecting method according to claim 12, wherein said threshold value deciding step comprises a step of creating a histogram which indicates frequencies of grayscale values of cells within a predetermined range, a step of obtaining a first grayscale value corresponding to a peak having a frequency equal to or greater than a predetermined value on a side of a large grayscale value in the histogram, a step of obtaining a second grayscale value corresponding to a peak having a frequency equal to or greater than a predetermined value on a side of a low grayscale value, and a step of deciding an average value of the first grayscale value and the second grayscale value as a threshold value.

14. The code boundary detecting method according to claim 7, wherein a comparison is made among grayscale values of an observed cell and its peripheral cells, and a cell having a large grayscale value is detected as a white cell if a difference among the grayscale values is equal to or greater than a predetermined value, in detection of the successive length of white cells.

15. A computer-readable portable storage medium, which is used by a computer determining a type of a code included in input image data, and on which is recorded a program for causing the computer to execute a process, the process comprising:

a step of selecting input image data in units of rectangular blocks;

a step of determining whether or not the selected block satisfies a predetermined condition; and a step of determining a type of code included in the block which satisfies the predetermined condition, wherein a distinction between one-dimensional code and two-dimensional code is made as a type of code in said determining the type of code.

16. The computer-readable portable storage medium according to claim 15, the process further comprising a step of determining whether or not the one-dimensional code is in a rotated state if the type of the code is determined to be the one-dimensional code.

17. A computer-readable portable storage medium, which is used by a computer detecting a boundary of two-dimensional code where data put into cells is arranged in a two-dimensional state, and on which is recorded a program for causing the computer to execute a process, the process comprising:

a first white successive length detecting step of scanning input image data, and detecting a successive length of white cells;

a second white successive length detecting step of scanning the input image data in a direction which intersects with a first white successive length, detecting a second successive length of white cells, which has an intersection with the first white successive length, and exceeds a predetermined length, drawing an extended line of the detected second successive length, and determining whether or not colors of all of points in the extended line are white; and a boundary detecting step of detecting an intersection of the first white successive length and a second white successive length as a code boundary position once the colors of all of points in the extended line are white.

* * * * *